US011954978B2

(12) United States Patent
Uberuaga et al.

(10) Patent No.: US 11,954,978 B2
(45) **Date of Patent: *Apr. 9, 2024**

(54) BOOST STAGE WITH METAMORPHIC GRAPHICAL ELEMENT

(71) Applicant: Aristocrat Technologies, Inc., Las Vegas, NV (US)

(72) Inventors: Christmas Uberuaga, Reno, NV (US); Allon Englman, Las Vegas, NV (US)

(73) Assignee: Aristocrat Technologies, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/932,873

(22) Filed: Sep. 16, 2022

(65) Prior Publication Data

US 2023/0015353 A1 Jan. 19, 2023

Related U.S. Application Data

(63) Continuation of application No. 16/790,548, filed on Feb. 13, 2020, now Pat. No. 11,450,181.

(51) Int. Cl.
*G07F 17/32* (2006.01)

(52) U.S. Cl.
CPC ...... *G07F 17/3267* (2013.01); *G07F 17/3213* (2013.01); *G07F 17/3269* (2013.01)

(58) Field of Classification Search
CPC .. G07F 17/32; G07F 17/3267; G07F 17/3269; G07F 17/3213; G07F 17/34
See application file for complete search history.

(56) References Cited

U.S. PATENT DOCUMENTS

| | | | |
|---|---|---|---|
| 5,833,537 | A | 11/1998 | Barrie |
| 5,947,820 | A | 9/1999 | Morro |

(Continued)

FOREIGN PATENT DOCUMENTS

| | | | |
|---|---|---|---|
| AU | 2008202678 A1 | 2/2009 | |
| AU | 2017279696 A1 | 7/2018 | |

OTHER PUBLICATIONS

Aristocrat Technologies Australia Pty Limited, "Fu Dai Lian Lian Panda," downloaded from https://www.aristocrat.com/apac/games/ba-bao-huang-long-emperor-2-2/, 4 pp. (downloaded on Feb. 13, 2020).

(Continued)

*Primary Examiner* — Chase E Leichliter
(74) *Attorney, Agent, or Firm* — Blank Rome LLP

(57) ABSTRACT

In an electronic gaming device, a boost stage uses a metamorphic graphical element. The boost stage starts when predetermined condition such as a "near-miss" condition occurs and provides an additional opportunity to satisfy a trigger condition for a supplemental feature. The metamorphic graphical element indicates how many times the predetermined condition has occurred since the supplemental feature was last triggered. When the boost stage starts, the state of the metamorphic graphical element can advance to a higher state value, visually indicating the additional opportunity to satisfy the trigger condition for the supplemental feature. For the boost stage, if the previous result (associated with the predetermined condition) is enhanced enough to satisfy the trigger condition, the supplemental feature is triggered and the metamorphic graphical element is reset. Otherwise, the boost stage finishes but the advanced state value of the metamorphic graphical element is maintained.

20 Claims, 20 Drawing Sheets

(56) References Cited

U.S. PATENT DOCUMENTS

| | | | | |
|---|---|---|---|---|
| D428,399 | S | 7/2000 | Kahn | |
| 6,097,390 | A | 8/2000 | Marks | |
| 6,287,194 | B1 | 9/2001 | Okada | |
| 6,364,765 | B1 | 4/2002 | Walker | |
| 6,428,412 | B1 | 8/2002 | Anderson | |
| 6,461,241 | B1 | 10/2002 | Webb | |
| 6,533,658 | B1 | 3/2003 | Walker | |
| 6,579,178 | B1 | 6/2003 | Walker | |
| 6,726,563 | B1 | 4/2004 | Baerlocher | |
| 7,175,527 | B2 | 2/2007 | Bryant | |
| D582,426 | S | 12/2008 | Chen | |
| 7,601,059 | B2 | 10/2009 | Bozeman | |
| D656,951 | S | 4/2012 | Weir | |
| D682,301 | S | 5/2013 | Dijulio | |
| D682,869 | S | 5/2013 | Aroner | |
| 8,460,090 | B1 * | 6/2013 | Gilliland | G07F 17/3206 463/19 |
| D696,265 | S | 12/2013 | D'Amore | |
| D696,677 | S | 12/2013 | Corcoran | |
| 8,608,556 | B2 | 12/2013 | Olive | |
| D701,223 | S | 3/2014 | Cho | |
| D716,326 | S | 10/2014 | Lee | |
| 8,957,897 | B1 | 2/2015 | Weichselbaum | |
| D732,569 | S | 6/2015 | Anzures | |
| D747,349 | S | 1/2016 | Park | |
| D761,282 | S | 7/2016 | Bain | |
| D766,961 | S | 9/2016 | Choi | |
| D767,621 | S | 9/2016 | Gagnier | |
| D768,154 | S | 10/2016 | Kim | |
| D768,707 | S | 10/2016 | Gagnier | |
| D781,908 | S | 3/2017 | Bhandari | |
| D783,046 | S | 4/2017 | Dzjind | |
| D789,384 | S | 6/2017 | Lin | |
| 9,711,006 | B2 | 7/2017 | Kendall | |
| D798,895 | S | 10/2017 | Kim | |
| D802,011 | S | 11/2017 | Friedman | |
| D808,422 | S | 1/2018 | Hoffman | |
| D810,117 | S | 2/2018 | Lin | |
| D810,123 | S | 2/2018 | McClellan | |
| D816,698 | S | 5/2018 | Oldenburger | |
| D819,059 | S | 5/2018 | O'Toole | |
| D819,060 | S | 5/2018 | Friedman | |
| D824,933 | S | 8/2018 | Harris | |
| D830,406 | S | 10/2018 | Baldi | |
| D833,468 | S | 11/2018 | Hsu | |
| D841,047 | S | 2/2019 | Papolu | |
| 10,242,534 | B2 | 3/2019 | Bryant | |
| 10,262,501 | B2 | 4/2019 | Satterlie | |
| D849,036 | S | 5/2019 | Fuller | |
| D849,046 | S | 5/2019 | Kuo | |
| D850,464 | S | 6/2019 | Satterlie | |
| D855,064 | S | 7/2019 | Lei | |
| 10,453,306 | B2 * | 10/2019 | Crispino | G07F 17/3267 |
| D870,767 | S | 12/2019 | Villafañe | |
| D873,280 | S | 1/2020 | Beesley | |
| D873,852 | S | 1/2020 | Pazmino | |
| D873,855 | S | 1/2020 | De Regt | |
| 10,535,229 | B2 | 1/2020 | Olive | |
| D879,796 | S | 3/2020 | Hung | |
| D881,900 | S | 4/2020 | Harmann | |
| D882,625 | S | 4/2020 | Dixit | |
| D887,436 | S | 6/2020 | Crandall | |
| D888,089 | S | 6/2020 | Chaudhri | |
| D890,200 | S | 7/2020 | Kokubo | |
| D895,642 | S | 9/2020 | Hoofnagle | |
| D895,661 | S | 9/2020 | Lei | |
| 10,789,812 | B2 | 9/2020 | Sanborn | |
| D900,123 | S | 10/2020 | Lopes et al. | |
| 10,810,840 | B2 | 10/2020 | Casey | |
| D903,691 | S | 12/2020 | Olive | |
| D907,652 | S | 1/2021 | Momchilov | |
| D908,134 | S | 1/2021 | Liebowitz | |
| D915,439 | S | 4/2021 | Chapple | |
| D916,817 | S | 4/2021 | Cicchi | |
| D916,922 | S | 4/2021 | Ive | |
| 10,970,958 | B2 | 4/2021 | Hirai | |
| D921,013 | S | 6/2021 | Boese | |
| D922,409 | S | 6/2021 | Visser | |
| D923,024 | S | 6/2021 | Montoya | |
| D923,047 | S | 6/2021 | Montoya | |
| D924,248 | S | 7/2021 | Boese | |
| D924,921 | S | 7/2021 | Bowey | |
| D925,575 | S | 7/2021 | Harmann | |
| D926,218 | S | 7/2021 | Moreira | |
| D926,778 | S | 8/2021 | Lockley | |
| D927,535 | S | 8/2021 | Pazmino | |
| D927,547 | S | 8/2021 | Visser | |
| D928,197 | S | 8/2021 | Pazmino | |
| D931,885 | S | 9/2021 | Davies | |
| D938,972 | S | 12/2021 | Boese | |
| D940,742 | S | 1/2022 | Vickers | |
| D942,466 | S | 2/2022 | Degens | |
| D943,609 | S | 2/2022 | Li | |
| 11,263,871 | B2 | 3/2022 | Penacho | |
| D949,166 | S | 4/2022 | Marks | |
| D949,167 | S | 4/2022 | Marks | |
| D951,272 | S | 5/2022 | Scott | |
| D952,646 | S | 5/2022 | Ludwick | |
| 11,450,181 | B2 * | 9/2022 | Uberuaga | G07F 17/3267 |
| D974,398 | S | 1/2023 | Visser | |
| D975,128 | S | 1/2023 | Visser | |
| 2002/0094856 | A1 * | 7/2002 | Bennett | G07F 17/3213 463/16 |
| 2003/0064793 | A1 | 4/2003 | Baerlocher | |
| 2004/0087368 | A1 * | 5/2004 | Gauselmann | G07F 17/3269 463/42 |
| 2004/0106448 | A1 * | 6/2004 | Gauselmann | G07F 17/32 463/25 |
| 2004/0235552 | A1 * | 11/2004 | Gauselmann | A63F 13/00 463/16 |
| 2005/0043082 | A1 | 2/2005 | Peterson | |
| 2006/0003829 | A1 | 1/2006 | Thomas | |
| 2006/0046830 | A1 | 3/2006 | Webb | |
| 2006/0148562 | A1 | 7/2006 | Walker | |
| 2007/0060254 | A1 * | 3/2007 | Muir | G07F 17/3244 463/16 |
| 2007/0077979 | A1 * | 4/2007 | Cohn | G07F 17/3244 463/16 |
| 2007/0243923 | A1 | 10/2007 | Seelig | |
| 2008/0113734 | A1 * | 5/2008 | Watkins | G07F 17/34 463/19 |
| 2008/0207312 | A1 | 8/2008 | Seelig | |
| 2009/0093299 | A1 * | 4/2009 | Acres | G07F 17/32 463/20 |
| 2009/0118000 | A1 | 5/2009 | Yoshizawa | |
| 2009/0197666 | A1 | 8/2009 | Visser | |
| 2009/0197668 | A1 * | 8/2009 | Visser | G07F 17/34 463/20 |
| 2009/0264171 | A1 * | 10/2009 | Acres | G07F 17/3211 463/16 |
| 2009/0305770 | A1 | 12/2009 | Bennett | |
| 2010/0029381 | A1 * | 2/2010 | Vancura | G07F 17/3244 463/30 |
| 2010/0323780 | A1 * | 12/2010 | Acres | G07F 17/3272 463/20 |
| 2011/0105216 | A1 | 5/2011 | Cohen | |
| 2012/0046089 | A1 | 2/2012 | Kemper | |
| 2012/0122544 | A1 * | 5/2012 | Roemer | G07F 17/34 463/20 |
| 2013/0065665 | A1 * | 3/2013 | Watkins | G07F 17/32 463/20 |
| 2013/0065674 | A1 | 3/2013 | Luciano, Jr. | |
| 2013/0157741 | A1 | 6/2013 | Pacey | |
| 2013/0252704 | A1 | 9/2013 | Gilbertson | |
| 2013/0281181 | A1 | 10/2013 | Langille | |
| 2014/0080570 | A1 | 3/2014 | Watkins | |
| 2014/0100022 | A1 | 4/2014 | Lewis | |
| 2014/0135096 | A1 | 5/2014 | Aida | |
| 2014/0179396 | A1 * | 6/2014 | Aoki | G07F 17/3267 463/20 |
| 2014/0248938 | A1 * | 9/2014 | Tidke | G07F 17/32 463/20 |
| 2014/0274299 | A1 | 9/2014 | Kitamura | |

(56) References Cited

U.S. PATENT DOCUMENTS

| | | | | |
|---|---|---|---|---|
| 2014/0274308 | A1 | 9/2014 | Guinn | |
| 2014/0295942 | A1 | 10/2014 | Kendall | |
| 2014/0364193 | A1 | 12/2014 | Williamson | |
| 2015/0094129 | A1* | 4/2015 | Acres | G07F 17/3218 463/22 |
| 2015/0099569 | A1 | 4/2015 | Suda | |
| 2015/0141114 | A1* | 5/2015 | Davis | G07F 17/34 463/20 |
| 2015/0206397 | A1* | 7/2015 | Nelson | G07F 17/323 463/42 |
| 2015/0262450 | A1 | 9/2015 | Elias | |
| 2015/0287286 | A1 | 10/2015 | Beria | |
| 2016/0086442 | A1 | 3/2016 | Hilbert | |
| 2016/0104344 | A1 | 4/2016 | Meyer | |
| 2016/0133100 | A1* | 5/2016 | Pececnik | G07F 17/3244 463/20 |
| 2016/0247361 | A1 | 8/2016 | Meyer | |
| 2016/0328926 | A1 | 11/2016 | Boese | |
| 2017/0024955 | A1* | 1/2017 | Pawloski | G07F 17/34 |
| 2017/0024957 | A1* | 1/2017 | Boese | G07F 17/3213 |
| 2017/0092047 | A1 | 3/2017 | Hendricks | |
| 2017/0092070 | A1 | 3/2017 | Marston | |
| 2017/0169662 | A1 | 6/2017 | Froy | |
| 2018/0025585 | A1 | 1/2018 | Schmidt | |
| 2018/0075692 | A1 | 3/2018 | Hirai | |
| 2018/0082533 | A1 | 3/2018 | Hallerbach | |
| 2018/0089942 | A1* | 3/2018 | Filipour | G07F 17/3244 |
| 2018/0130296 | A1* | 5/2018 | Berman | G07F 17/3244 |
| 2018/0197379 | A1 | 7/2018 | Crispino | |
| 2018/0204632 | A1 | 7/2018 | Kang | |
| 2019/0043316 | A1* | 2/2019 | SeLegue | G07F 17/3244 |
| 2019/0130705 | A1* | 5/2019 | Nelson | G07F 17/3218 |
| 2019/0304248 | A1 | 10/2019 | Bryant | |
| 2019/0355206 | A1 | 11/2019 | Kania | |
| 2020/0051374 | A1* | 2/2020 | Solaja | G07F 17/3223 |
| 2020/0098221 | A1 | 3/2020 | Hendricks | |
| 2020/0160663 | A1* | 5/2020 | Berman | G07F 17/3267 |
| 2020/0312086 | A1 | 10/2020 | Kendall | |
| 2020/0312087 | A1 | 10/2020 | Kendall | |
| 2020/0312095 | A1* | 10/2020 | Kendall | G07F 17/3213 |
| 2020/0357240 | A1 | 11/2020 | Tam | |
| 2021/0065513 | A1* | 3/2021 | Ludwick | G07F 17/3267 |
| 2021/0104127 | A1 | 4/2021 | Schaefer | |
| 2021/0110676 | A1* | 4/2021 | Davis | G07F 17/34 |
| 2021/0256811 | A1* | 8/2021 | Uberuaga | G07F 17/3213 |
| 2022/0122010 | A1 | 4/2022 | Barcelos | |
| 2023/0015353 | A1* | 1/2023 | Uberuaga | G07F 17/3213 |
| 2023/0169118 | A1 | 6/2023 | Aso | |

OTHER PUBLICATIONS

Vimeo, "Fu Dai Lian Lian," downloaded from https://vimeo.com/352401309, 10 pp. (downloaded on Feb. 13, 2020).

Youtube video, "Cash Fusion—Peacock Riches," MGS Summit Macau, downloaded from https://www.youtube.com/watch?v=6jaKVWJt56Q, 1 p. (Nov. 2017).

Office Action dated May 18, 2020 for U.S. Appl. No. 16/779,540 (pp. 1-12).

Office Action dated Jan. 14, 2021 for U.S. Appl. No. 29/722,810 (pp. 1-7).

New Game Nice Profit Fu Dai Lian Lian Dragon Slot (Aristocrat), by KURI Slot, dated Dec. 11, 2019, youtube.com [online]. Retrieved Jan. 11, 2021 from internet <URL:https://www.youtube.com/watch?v=5kX2ZXirx_O> (Year: 2019).

Fu Dai Lian Lian, dated to Oct. 25, 2020, aristocrat-us.com [online]. Retrieved from internet <URL:https://web.archive.org/web/20201125023325/https://www.aristocrat-us.com/fu-dai-lian-1ian> (Year: 2020).

Notice of Allowance dated Aug. 27, 2020 for U.S. Appl. No. 16/779,540 (pp. 1-8).

Office Action dated Jun. 18, 2021 for U.S. Appl. No. 16/790,548 (pp. 1-16).

Notice of Allowance dated Feb. 18, 2021 for U.S. Appl. No. 29/722,810 (pp. 1-8).

Notice of Allowance dated Jun. 16, 2021 for U.S. Appl. No. 29/722,813 (pp. 1-9).

Julia Lemba, "Moneybag Simple Cartoon" Mar. 14, 2019 https://www.istockphoto.com/vector/ moneybag-simple-cartoon-infographics-isolated-on-blue-background-moneybag-simple-gm1135787086-302281081.

Corrected Notice of Allowability dated Jul. 8, 2021 for U.S. Appl. No. 29/722,813 (pp. 1-2).

Office Action (Final Rejection) dated Jan. 20, 2022 for U.S. Appl. No. 16/790,548 (pp. 1-16).

Notice of Allowance dated Sep. 29, 2020 for US App. No. 16/659,177 (pp. 1-9).

Office Action (Non-Final Rejection) dated Jan. 10, 2022 for U.S. Appl. No. 17/150,839 (pp. 1-6).

Office Action (Non-Final Rejection) dated Jan. 7, 2022 for U.S. Appl. No. 16/830,232 (pp. 1-13).

Office Action (Non-Final Rejection) dated Jan. 21, 2022 for U.S. Appl. No. 16/830,239 (pp. 1-19).

Office Action (Non-Final Rejection) dated Feb. 22, 2022 for U.S. Appl. No. 17/129,427 (pp. 1-10).

Office Action (Non-Final Rejection) dated Mar. 29, 2022 for U.S. Appl. No. 17/388,894 (pp. 1-22).

Australian Examination Report for App No. AU2019222868, dated May 22, 2020, 4 pages.

Office Action dated Aug. 27, 2020 for U.S. Appl. No. 16/659,177 (pp. 1-6).

Office Action (Notice of Allowance and Fees Due (PTOL-85)) dated May 17, 2022 for U.S. Appl. No. 16/790,548 (pp. 1-9).

Office Action (Notice of Allowance and Fees Due (PTOL-85)) dated Apr. 27, 2022 for U.S. Appl. No. 17/150,839 (pp. 1-8).

Notice of Allowance dated May 13, 2022 for U.S. Appl. No. 29/782,345 (pp. 1-11).

Notice of Allowance dated May 16, 2022 for U.S. Appl. No. 29/809,073 (pp. 1-11).

New Game Nice Profit, by KURI Slot, dated Dec. 11, 2019, youtube.com [online]. Retrieved May 5, 2022 from internet <URL:https:// www.youtube.com/watch?v=5kX27Xirx_0> (Year:2019).

Notice of Allowance dated Jun. 20, 2022 for U.S. Appl. No. 29/795,991 (pp. 1-9).

Notice of Allowance dated Jun. 20, 2022 for U.S. Appl. No. 29/808,901 (pp. 1-9).

Notice of Allowance dated Jun. 27, 2022 for U.S. Appl. No. 29/782,345 (pp. 1-8).

Notice of Allowance dated Jun. 27, 2022 for U.S. Appl. No. 29/809,073 (pp. 1-8).

Office Action (Notice of Allowance and Fees Due (PTOL-85)) dated Jul. 15, 2022 for U.S. Appl. No. 16/830,232 (pp. 1-9).

Office Action (Notice of Allowance and Fees Due (PTOL-85)) dated Jul. 25, 2022 for U.S. Appl. No. 17/129,427 (pp. 1-7).

Notice of Allowance dated Jul. 27, 2022 for U.S. Appl. No. 29/795,991 (pp. 1-4).

Notice of Allowance dated Aug. 19, 2022 for U.S. Appl. No. 29/795,991 (pp. 1-7).

Notice of Allowance dated Aug. 19, 2022 for U.S. Appl. No. 29/808,901 (pp. 1-7).

Office Action (Notice of Allowance and Fees Due (PTOL-85)) dated Sep. 1, 2022 for U.S. Appl. No. 16/830,239 (pp. 1-8).

Office Action (Notice of Allowance and Fees Due (PTOL-85) dated Oct. 19, 2022 for U.S. Appl. No. 16/830,232 (pp. 1-5).

Office Action (Notice of Allowance and Fees Due (PTOL-85)) dated Oct. 26, 2022 for U.S. Appl. No. 16/830,239 (pp. 1-5).

Office Action (Notice of Allowance and Fees Due (PTOL-85) dated Oct. 21, 2022 for U.S. Appl. No. 17/129,427 (pp. 1-7).

Office Action (Final Rejection) dated Nov. 21, 2022 for U.S. Appl. No. 17/388,894 (pp. 1-24).

Office Action (Notice of Allowance and Fees Due (PTOL-85)) dated Jan. 31, 2023 for U.S. Appl. No. 16/830,232 (pp. 1-5).

Office Action (Notice of Allowance and Fees Due (PTOL-85)) dated Feb. 15, 2023 for U.S. Appl. No. 16/830,239 (pp. 1-5).

Office Action (Notice of Allowance and Fees Due (PTOL-85)) dated Feb. 9, 2023 for U.S. Appl. No. 17/129,427 (pp. 1-7).

(56) References Cited

OTHER PUBLICATIONS

Notice of Allowance dated May 1, 2023 for U.S. Appl. No. 29/809,716 (pp. 1-9).
Office Action (Notice of Allowance and Fees Due (PTOL-85)) dated Aug. 18, 2023 for U.S. Appl. No. 17/388,894 (pp. 1-9).
Notice of Allowance dated Sep. 11, 2023 for U.S. Appl. No. 29/881,793 (pp. 1-10).
Iv_design, “Different colorful empty bowl” Nov. 6, 2017 https://www.istockphoto.com/vector/ vector-illustration-set-of-food-icons-different-colourful-empty-bowls-for-breakfast-gm870471238.

* cited by examiner

602

603

604 display screen 610 jackpot area 620 animation 650 indicating transition to new state value of metamorphic graphical element reels in configuration 641 that satisfies near-miss condition

605

606 display screen 610 jackpot area 620 animation 660 indicating transition for triggering of supplemental feature reels in configuration 641 that satisfies near-miss condition

607 display screen 610 jackpot area 620 animation 660 indicating transition for triggering of supplemental feature reels in configuration 641 that satisfies near-miss condition FIG. 7c 703 (example of 750)
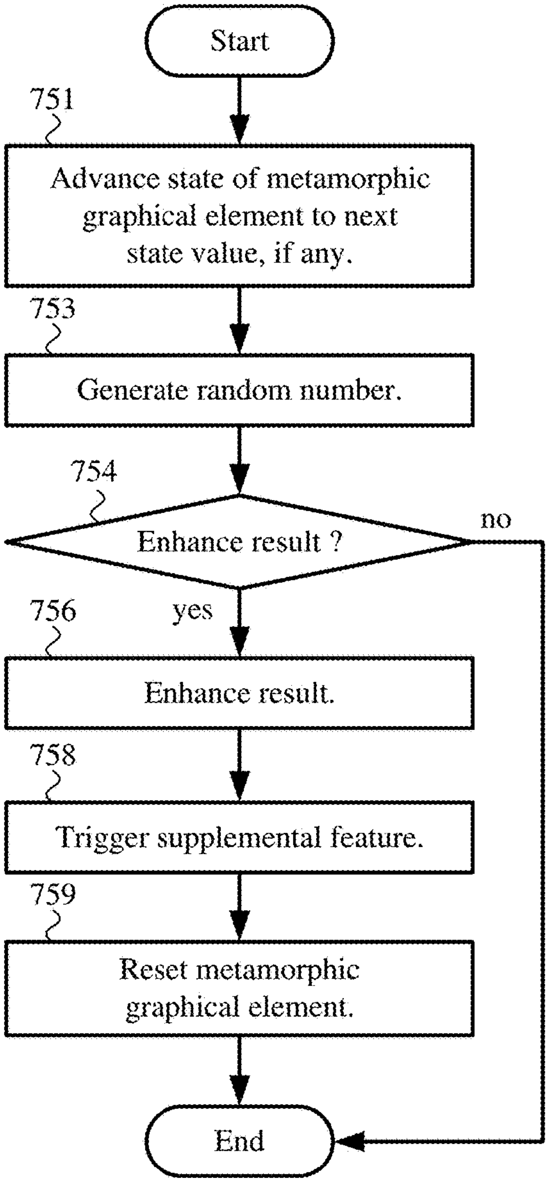
FIG. 7d 704 (example of 760)
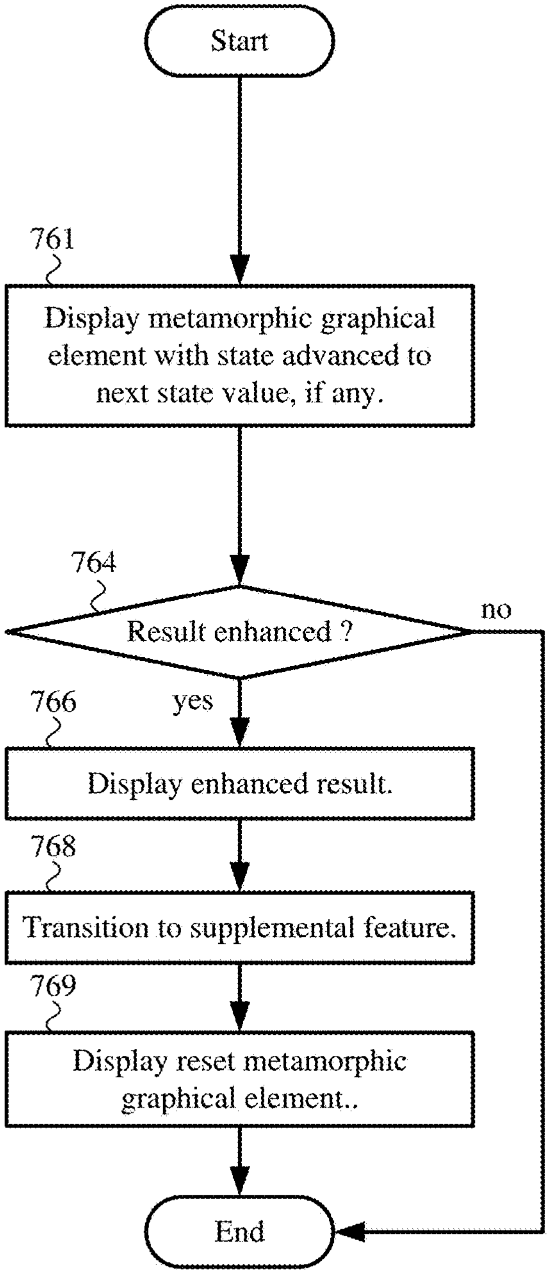

FIG. 7f 706 (example of 750)
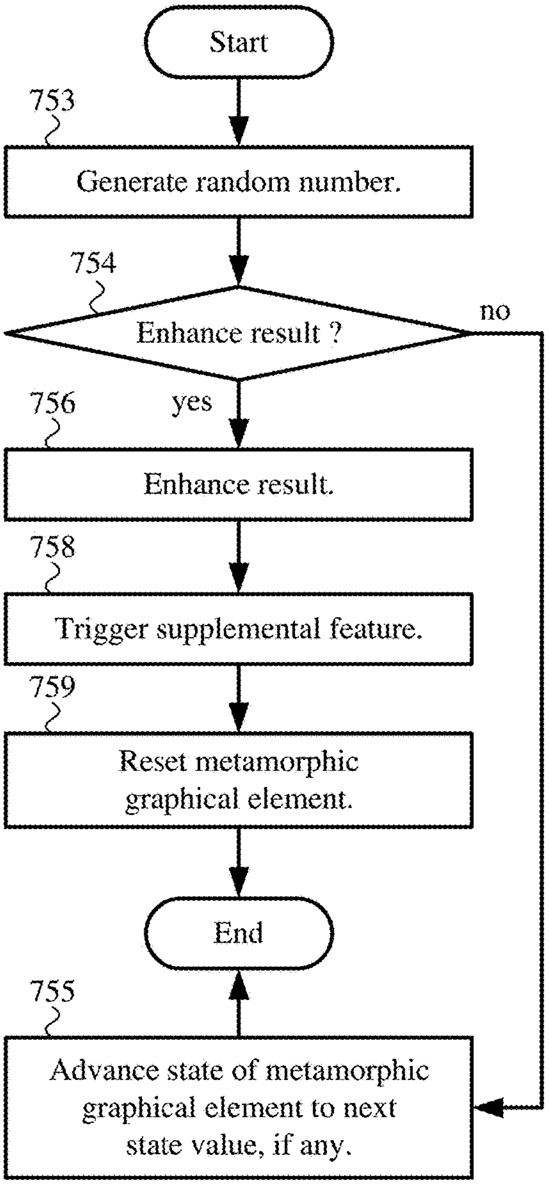
FIG. 7g 707 (example of 760)
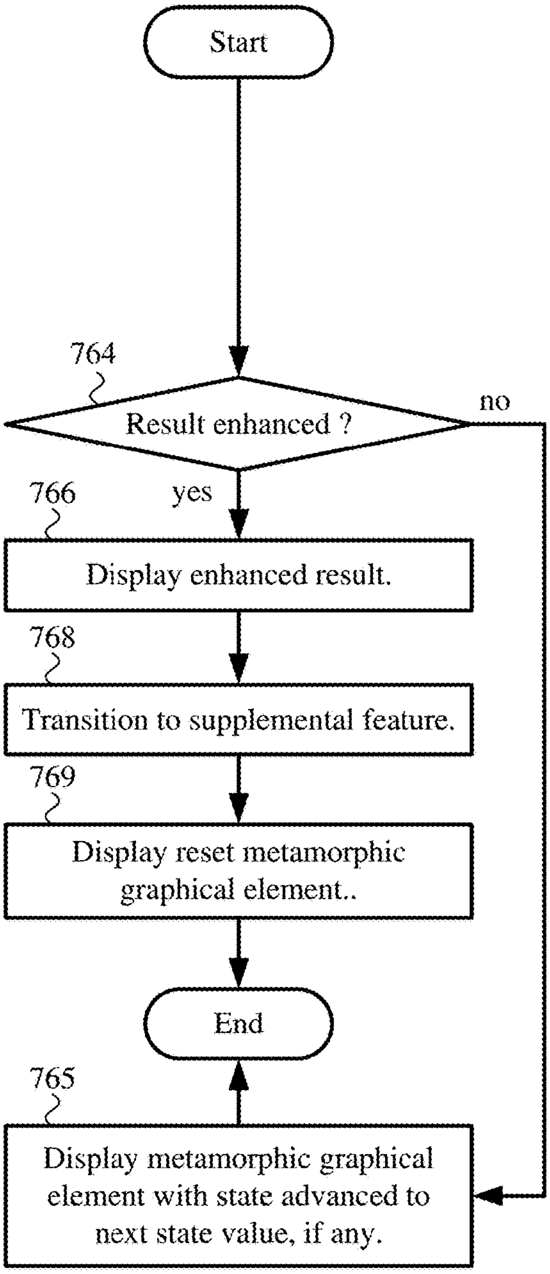

BOOST STAGE WITH METAMORPHIC GRAPHICAL ELEMENT

FIELD

User interface ("UP") features of electronic gaming devices are described herein, along with features of backend processing to implement the UI features. For example, in an electronic gaming device, a boost stage uses a metamorphic graphical element that indicates how many times a predetermined condition, such as a "near-miss" condition for triggering of a supplemental feature, has occurred.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator ("RNG") to randomly determine the outcome of each game. The game is designed to return a certain percentage of the amount wagered back to the player over the course of many plays or instances of the game, which is generally referred to as return to player ("RTP"). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

EGMs depend on usability to enhance the user experience and extend player time on the EGMs. Although previous EGMs include various UI features, and backend operations associated with the UI features, that improve usability and enhance the user experience, there is room for further improvement to EGMs.

SUMMARY

In summary, the detailed description presents innovations in user interface ("UP") features of electronic gaming devices, as well as innovations in features of backend processing to implement the UI features. For example, some innovations relate to use of a boost stage with a metamorphic graphical element. The boost stage starts when predetermined condition such as a "near-miss" condition occurs. A near-miss condition occurs when the trigger condition for a supplemental feature such as a bonus game or special mode is not satisfied, but is "almost" satisfied (i.e., is close to—within a threshold range of—being satisfied). The boost stage provides an additional opportunity to satisfy the trigger condition. The metamorphic graphical element indicates how many times the predetermined condition has occurred since the supplemental feature was last triggered. When the boost stage starts, the state of the metamorphic graphical element advances to a higher state value, visually indicating the additional opportunity to satisfy the trigger condition for the supplemental feature. For the boost stage, if the previous result (associated with the predetermined condition) is enhanced enough to satisfy the trigger condition, the supplemental feature is triggered and the metamorphic graphical element is reset. Otherwise, the boost stage finishes but the advanced state value of the metamorphic graphical element is maintained. By providing visual feedback about how many times the predetermined condition has occurred, the innovations can improve the usability of electronic gaming devices by enhancing the user experience for players, extending player time on the electronic gaming devices, and maintaining the interest of current players in the electronic gaming devices.

For example, according to a first set of innovations described herein, a computer system is configured to perform backend operations to control a UI of an electronic gaming device. The backend operations include determining that a result satisfies a near-miss condition for a supplemental feature. In response to the determination that the result satisfies the near-miss condition, a boost stage is triggered that uses a metamorphic graphical element. The metamorphic graphical element indicates how many times the near-miss condition has occurred during a tracking period. The metamorphic graphical element has a current state with any of multiple state values. For the boost stage, the supplemental feature is selectively triggered and the metamorphic graphical element is adjusted. In particular, if the supplemental feature is triggered in the boost stage, the metamorphic graphical element is reset. Otherwise, the current state is advanced to a next state value, if any, among the multiple state values.

As another example, according to a second set of innovations described herein, a computer system is configured to perform UI-focused operations to control the UI of an electronic gaming device. The UI-focused operations include displaying a metamorphic graphical element, which indicates how many times a near-miss condition for a supplemental feature has occurred during a tracking period. The metamorphic graphical element has a current state with any of multiple state values that correspond to depictions of the metamorphic graphical element. The operations also include displaying a result that satisfies the near-miss condition. For a boost stage, which is triggered in response to a determination that the result satisfies the near-miss condition, the displaying of the metamorphic graphical element is adjusted. In particular, if the supplemental feature has been triggered in the boost stage, the metamorphic graphical element is displayed as reset. Otherwise, the metamorphic graphical element is displayed with the current state advanced to a next state value, if any, among the multiple state values.

The innovations can be implemented as part of a method, as part of an electronic gaming device such as an EGM or electronic gaming server configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

FIGS. 7*c*, 7*e*, and 7*f* are flowcharts showing example backend operations when selectively triggering a supplemental feature and adjusting a metamorphic graphical element. FIGS. 7*d* and 7*g* are flowcharts showing example UI-frontend operations when adjusting a metamorphic graphical element.

DETAILED DESCRIPTION

Figure 1:
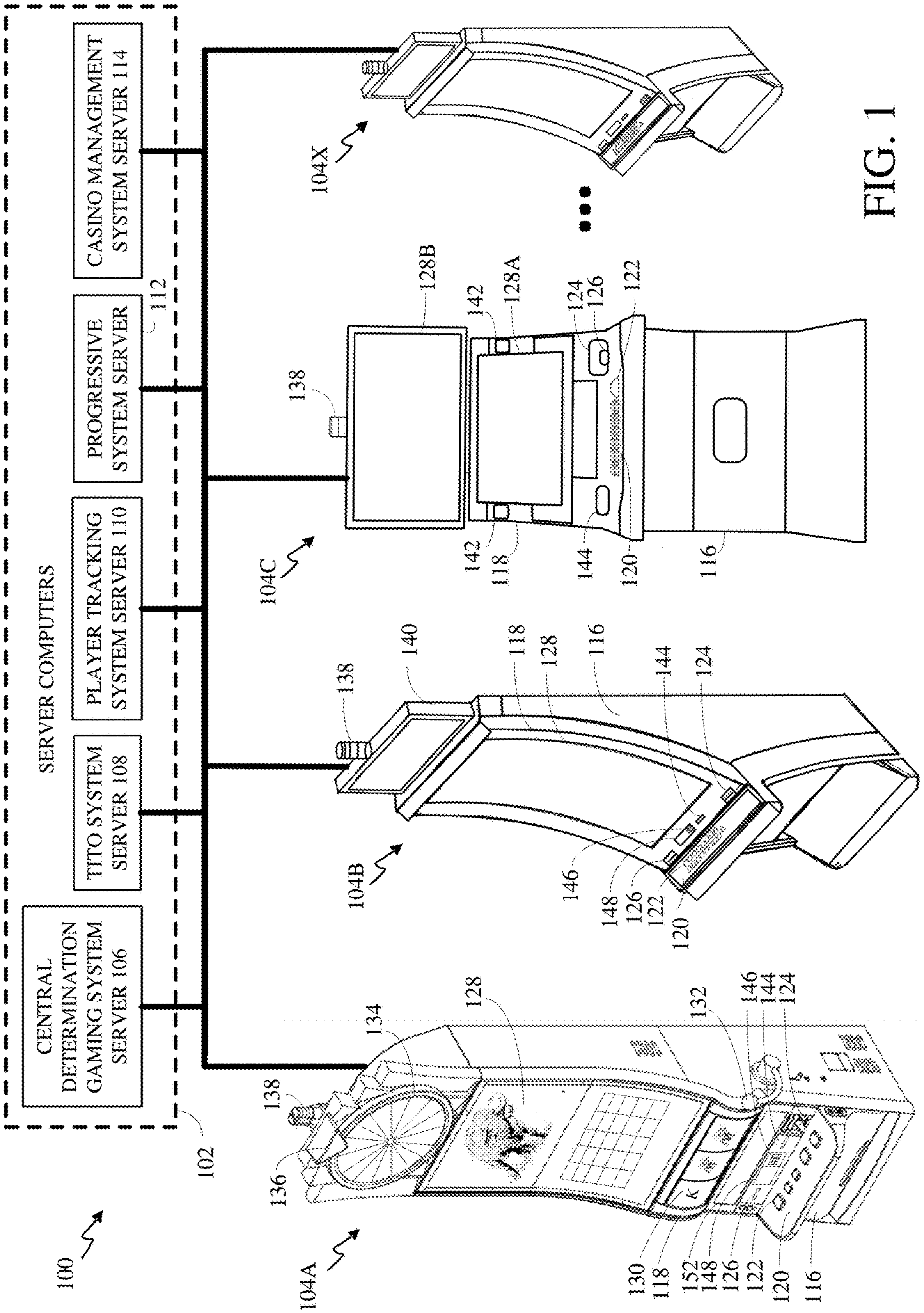
FIG. 1 is an exemplary diagram showing several EGMs networked with various gaming related servers.

The detailed description presents innovations in user interface ("UI") features of electronic gaming devices, as well as innovations in features of backend processing to implement the UI features. In particular, the innovations relate to use of a boost stage with a metamorphic graphical element. In some example implementations, by providing visual feedback about how many times a predetermined condition such as a near-miss condition has occurred, the innovations improve usability of electronic gaming devices by enhancing the user experience for players, extending player time on the electronic gaming devices, and maintaining the interest of current players in the electronic gaming devices.

In an electronic gaming device, a supplemental feature such as a bonus game or special mode can be triggered upon satisfaction of a trigger condition. A "near-miss" condition happens if the trigger condition is not satisfied but is "almost" satisfied (i.e., is close to—within a threshold range of—being satisfied). A boost stage can start when a near-miss condition occurs, providing an additional opportunity to satisfy the trigger condition. In some example implementations, the trigger condition for a supplemental feature is a threshold count of target symbols in a set of reels, and the threshold range is one symbol less than the threshold count of target symbols. After target symbols have stopped in the reels (e.g., landed in the reels, been transferred to the reels), if the count of target symbols in the reels is one less than the threshold count, the boost stage starts, providing an opportunity to add a target symbol to the reels and thereby satisfy the trigger condition for the supplemental feature.

Alternatively, the predetermined condition can be defined in some other way. For example, the predetermined condition can happen if a target symbol (such as a wild symbol, scatter symbol, etc.) lands on a specific reel (e.g., first reel, last reel), or if a combination of target symbols lands on one or more specific reels. A boost stage can start when the predetermined condition occurs, providing an additional opportunity to satisfy a trigger condition.

In examples described herein, a boost stage has a metamorphic graphical element, which can indicate how many times the predetermined condition has occurred since the supplemental feature was last triggered from the boost stage. The metamorphic graphical element has a current state with any of multiple possible state values, corresponding to different depictions of the metamorphic graphical element on a progression from an initial state value to a final state value (e.g., empty to full; cold to hot; dark to light; small to large; or vice versa). Upon initialization or reset of the boost stage, the current state of the metamorphic graphical element is set to the initial state value. Thereafter, after entry into the boost stage, the current state of the metamorphic graphical element can advance to a higher state value, visually indicating the additional opportunity to satisfy the trigger condition for the supplemental feature. In some example implementations, the metamorphic graphical element is a bowl, bag, or other container, and the multiple state values correspond to different levels of fullness of the container. Upon initialization or reset of the boost stage, the container is empty or has minimal fullness. Thereafter, after entry into the boost stage, the container can advance to a higher fullness, at least until a maximal fullness has been reached.

For the boost stage, depending at least in part on a random number generation event, a previous result (associated with the predetermined condition) is selectively enhanced to satisfy the trigger condition for the supplemental feature. If the previous result is enhanced enough to satisfy the trigger condition, the supplemental feature is triggered and the metamorphic graphical element is reset. Otherwise (when the previous result is not enhanced enough to satisfy the trigger condition), the boost stage finishes but the advanced, higher state value of the metamorphic graphical element is maintained for the boost stage. For example, during the boost stage, a target symbol is selectively added or not added to reels. If the target symbol is added to the reels, the trigger condition is satisfied, so the supplemental feature is triggered and the metamorphic graphical element is reset. On the other hand, if the target symbol is not added to the reels, the trigger condition is still not satisfied, and the advanced, higher state value of the metamorphic graphical element is maintained for the boost stage.

By providing visual feedback about how many times the predetermined condition has occurred since the supplemental feature was last triggered from the boost stage, the metamorphic graphical element maintains the interest of current players in the electronic gaming devices. This enhances the user experience for players, potentially extending player time on the electronic gaming devices.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense.

Example Electronic Gaming Servers and Electronic Gaming Machines ("EGMs")

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency ("RF") (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out ("TITO") system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket (TITO) system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
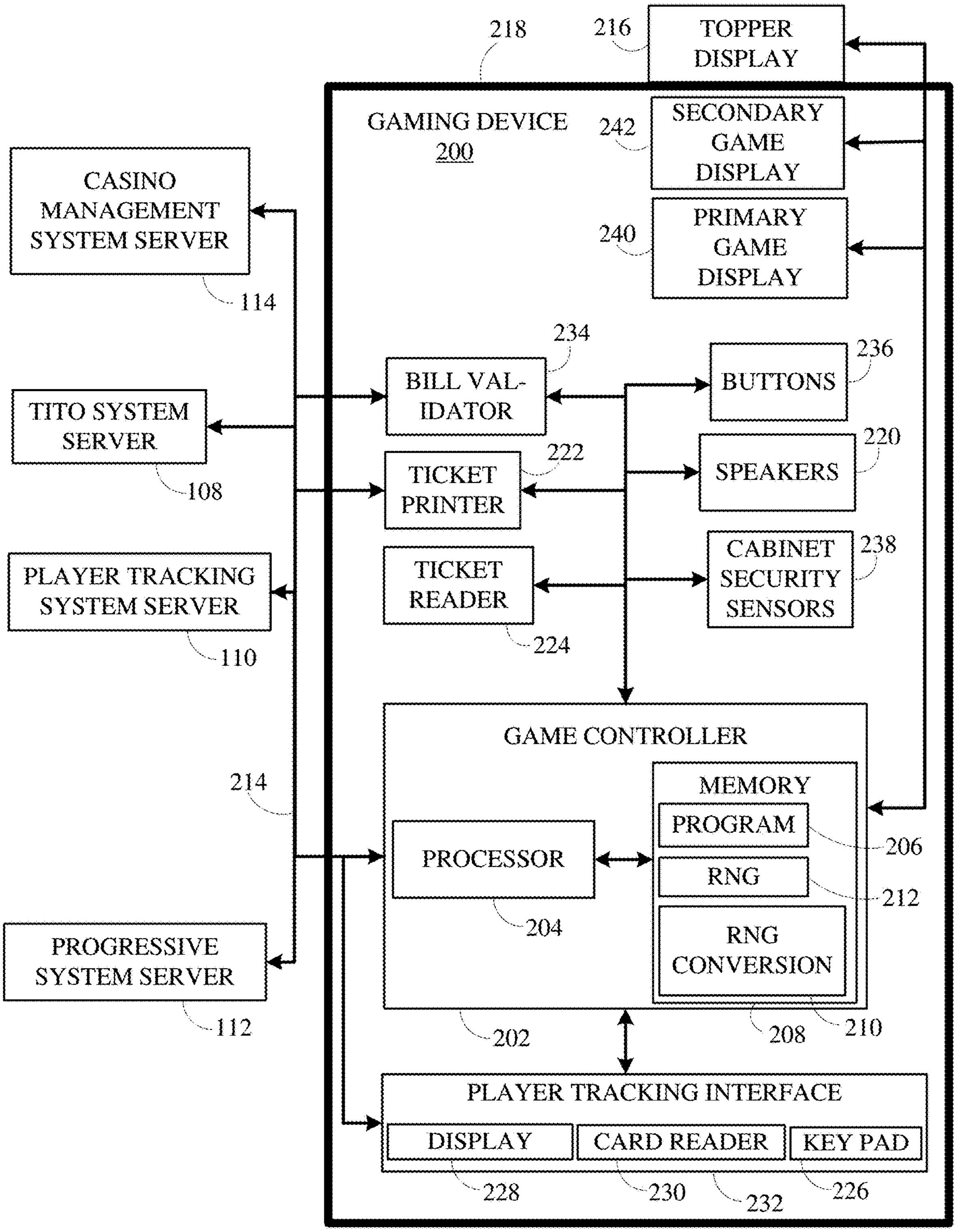
FIG. 2 is a block diagram showing various functional elements of an exemplary EGM.

Many or all the above described components can be controlled by circuitry (e.g., a game controller) housed inside the main cabinet 116 of the gaming device 104A, the details of which are shown in FIG. 2.

An alternative example gaming device 104B illustrated in FIG. 1 is the Arc' model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on a chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Those of skill in the art will appreciate that embodiments of the present disclosure could be implemented with more or fewer elements than are depicted in FIG. 2. The pictured example embodiments of a gaming device 200, as well as example gaming devices 104A-C, are merely a few examples from a wide range of possible gaming device designs on which embodiments of the present disclosure may be implemented. Depending on implementation and the type of processing desired, components of the gaming device 200 can be added, omitted, split into multiple components, combined with other components, and/or replaced with like components. In alternative embodiments, gaming devices with different components and/or other configurations of components perform one or more of the described techniques. Specific embodiments of gaming devices typically use a variation or supplemented version of the gaming device 200. The relationships shown between components within the gaming device 200 indicate general flows of information in the gaming device 200; other relationships are not shown for the sake of simplicity. In general, the game controller 202 can be implemented by software executable on a CPU, by software controlling special-purpose hardware, or by special-purpose hardware (e.g., in an ASIC).

II. Example Game Processing Architectures

Figure 3:
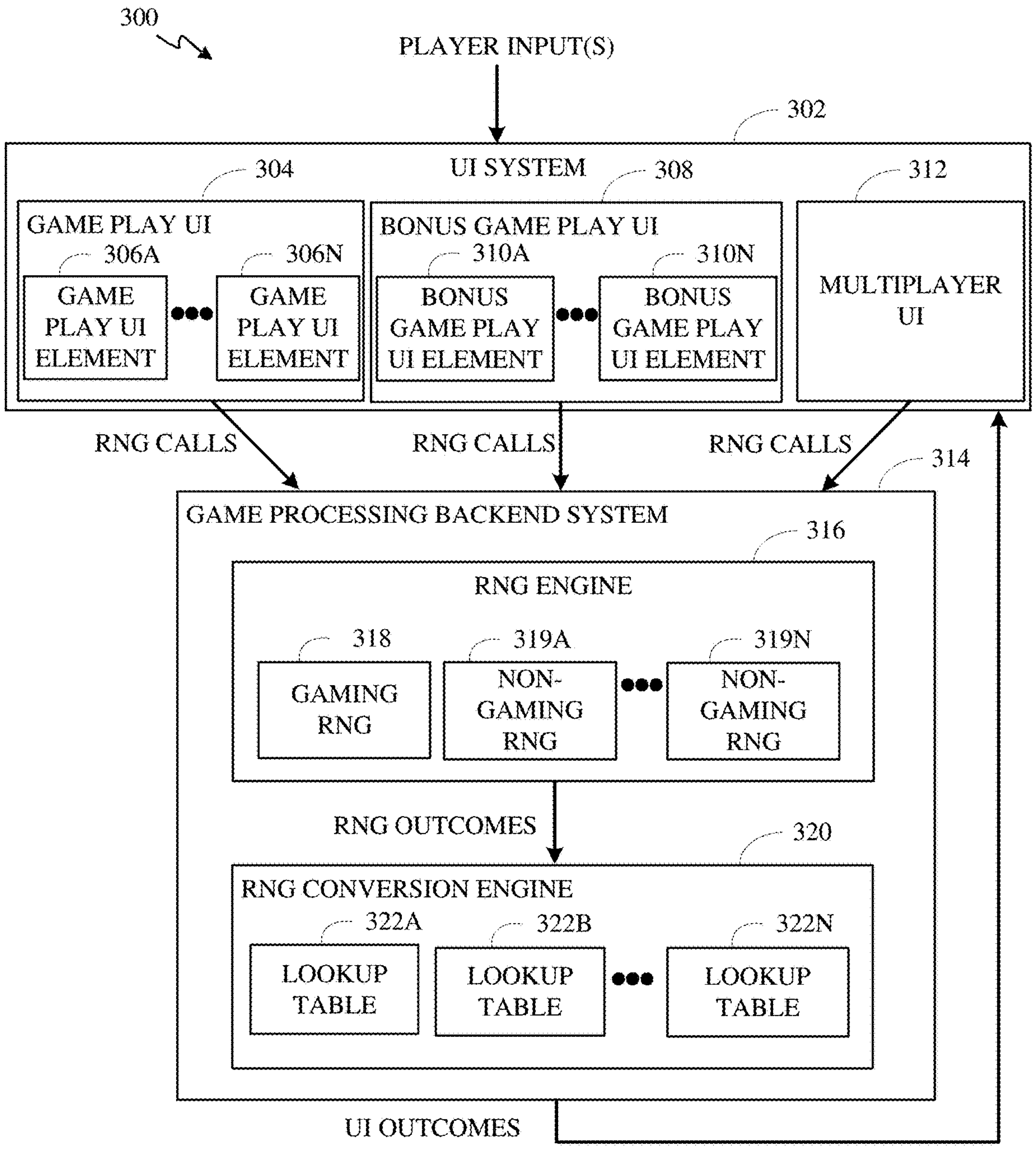
FIG. 3 illustrates, in block diagram form, an embodiment of a game processing architecture algorithm that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differ or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces ("APIs") to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator ("PRNG") (e.g., Fortuna PRNG) that securely produces random numbers for one or more game features. To generate random numbers, gaming RNG 318 could collect random data from various sources of entropy, such as from an operating system ("OS"). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The example game processing architecture 300 shown in FIG. 3 can be used to process game play instructions and generate outcomes as described in Section IV.

III. Example Reel Games, Supplemental Features, and Outcome Determinations

Electronic gaming devices can incorporate the innovations described herein into various types of reel games or other games. A reel game can be a base reel game or bonus reel game. A base, or primary, reel game includes play that involves spinning reels. A bonus, or secondary, reel game/feature can add the possibility of winning a relatively large payout. A bonus reel game/feature may require an additional wager, but typically does not. A single play of a reel game can constitute a single complete game or wager, e.g., a single spin of the reels or a series of spins which culminate in a final aggregate outcome. In some example implementations, an electronic gaming device can conduct a base reel game, a bonus reel game, and a gateway wheel game. A reel game uses spinning reels and one or more reel areas (game windows) on a display screen.

For a reel game, a reel area encloses viewable portions of a set of reels associated with the reel area. For each of the reels, the viewable portion of the reel includes one or more positions for symbols. Thus, the reel area is a matrix of symbols on a display screen, and may be highlighted graphically to emphasize reels and symbols within the reel area. The number of reels and dimensions of the reel area depend on implementation. In some typical configurations, a reel area has an m×n configuration, with m reels and with n symbols visible per reel. For example, for a base reel game, a reel area can have a 5×3 configuration—five reels per window, with three symbols showing in the window for each of the reels. More generally, the reel area spans m reels in a first dimension and spans n symbols in a second dimension orthogonal to the first dimension, where the value of m can be 4, 5, 6, 7, 8, or some other number of reels, and the value of n can be 2, 3, 4, 5, 6, or some other number of symbols. Typically, the m reels are arranged horizontally in the reel area from left-to-right, with the m reels spinning vertically and the reel area showing n symbols of each of the respective reels. Alternatively, the m reels are arranged vertically in the reel area from top-to-bottom, with the m reels spinning horizontally and the reel area showing n symbols of each of the respective reels. Alternatively, a reel area can have another configuration. For example, a reel area can have different numbers of symbols visible for different reels (e.g., going left to right in a reel area, two symbols visible for a leftmost reel, three symbols visible for a second reel, four symbols visible for a center reel, three symbols visible for a fourth reel, and two symbols visible for a rightmost reel). Or, as further explained below, a reel area can have a p×q configuration, with p×q reels visible in a rectangular reel area, and a single symbol visible per reel.

For each of the reels, a reel strip includes x positions along a one-dimensional strip of symbols, where x depends on implementation. For example, x is 30, 80, 100, 200, or some other number of positions. The value of x can be the same or different for different reels (thus, different reels can have different numbers of positions). Each reel can have a data structure (e.g., array, linked list) that tracks the symbols at the respective positions of the reel strip for the reel. In some example implementations, the configuration of the symbols at the positions of the reel strips for the reels of a reel game is fixed after the reel game boots, although limited reconfiguration operations may be permitted. In other example implementations, the configuration of the symbols at the positions of the reel strips for the reels of a reel game can change dynamically after the reel game boots (e.g., depending on bet level or some other factor). Different sets of reels can be used for a base reel game and bonus reel game (or other supplemental feature such as a special mode of the base reel game). For example, for a special mode of a base reel game, more "valuable" symbols, such as wild symbols or scatter symbols, can be added to the reels of a base reel game or swapped in for other symbols on the reels.

The symbol set for reels has various types of symbols, including target symbols and other symbols. The symbols can be static or animated. In some example implementations, the symbol set for the reels includes a target symbol type, at least one jackpot symbol type, a wild symbol type, some number of picture symbol types, some number of minor/low symbol types, and a scatter symbol type (which triggers bonuses). Alternatively, the symbol set for the reels can include other and/or additional symbols. The symbol set can be the same or different between a base reel game and bonus reel game (or other supplemental feature). In some example implementations, some types of symbols are dimmed out (not active) at times (e.g., symbols other than target symbols are dimmed out during a supplemental feature).

As in a reel game with physical reels, the reels of a reel game on a display screen "spin" graphically through a reel area on the display screen when a player actuates a "spin" or "play" button, which acts as a "handle pull" event. A backend system randomly selects symbol stop positions in the respective reels, and the respective reels stop at the selected symbol stop positions, with some number of symbols visible in the game window for each of the reels. For example, for a given reel, the backend system generates a random number and determines a symbol stop position on the reel strip of the reel using the random number (e.g., with a lookup table). The backend system generates different random numbers for the respective reels that are spun. In this way, the backend system can determine which symbols of the respective reels are visible in the game window (reel area) on the display screen. In other scenarios, symbols visible in a reel area can be "transferred" from another reel area when certain conditions are satisfied. For example, symbols can be graphically transferred or otherwise added to the reel area for a bonus reel game from a base reel game upon the occurrence of certain conditions for the base reel game.

In general, a display screen (or simply "display" or "screen") for a reel game is an area that conveys information to a viewer. The information may be dynamic, in which case, the display screen may use LCD technology, LED technology, CRT technology, or some other display technology. A main display screen (also called a primary game screen or main display) can be a display screen or an area of a display screen used to display game information related to a base reel game, such as a video representation of one or more spinning reels. A secondary display screen (also called a secondary game screen or bonus display) can be a display screen or an area of a display screen used to display secondary game information, such as animations and other graphics associated with a bonus reel game. A credit display can display a player's current number of credits, cash, account balance, or the equivalent. A bet display can display a player's amount wagered. The credit display and/or bet display may be standalone displays, independent of the main display and bonus display. Alternatively, the credit display and/or bet display can be incorporated into the main display or bonus display. Any of the display screens can be implemented as a touchscreen, with an associated touchscreen controller. In this case, such display screens may be operated as input devices in addition to presenting information, to provide input game play decisions (e.g., actions on and selection of game presentation objects).

An electronic gaming device may award a bonus reel game, a special mode for a base reel game, or other supplemental feature to a player. A supplemental feature may enhance the electronic gaming device and the experience of players by adding elements of excitement and chance. The supplemental feature can utilize a different set of reels, display screens, controls, symbols, etc. than the base reel game in normal operation. Alternatively, the supplemental feature can reuse or reconfigure at least some of the reels, display screens, symbols, etc. of a base reel game. The supplemental feature can be started in response to satisfaction of a trigger condition. For example, the supplemental feature can be triggered upon the occurrence of some defined combination of symbols or threshold count of target symbols in one or more sets of reels. Alternatively, the supplemental feature can be triggered in some other way.

In some example implementations, the supplemental feature is a hold-and-spin feature, which is a type of bonus reel game. The hold-and-spin feature is activated for a reel area that encloses at least a threshold count of target symbols. During the hold-and-spin feature, reels can include symbols from the same set of symbols as a base reel game or a different set of symbols. To distinguish from regular gameplay, inactive symbols (symbols other than target symbols) can be displayed differently during the hold-and-spin feature (e.g., with lower brightness). The target symbols remain active during the hold-and-spin feature. During the hold-and-spin feature, target symbols are held in place (locked) in a reel area while reels spin for other symbol positions of the reel area. For example, each symbol position in a reel area can have its own reel. Thus, for each of the 15 symbol positions of a reel area with a 5×3 configuration of reels, the hold-and-spin feature can use a different reel. (But no reel spins in a position when a target symbol is held in that position.) Initially, a player is given r spins for the hold-and-spin feature in a reel area. For example, r is 3. Alternatively, r has some other value. When the player actuates a button to spin the reels or otherwise starts a spin of the hold-and-spin feature, all non-locked reels in the reel area spin and eventually stop, and r is decremented. If any new target symbols land in the reel area, those new target symbol(s) as well as previous target symbols are held in place (locked) and r is reset to its initial value. Locked target symbols are held until the end of the hold-and-spin feature. When r reaches 0 or all symbol positions are occupied by target symbols, an outcome is determined based on the target symbols (e.g., adding credit values of the target symbols).

Alternatively, another type of supplemental feature can be activated if a reel area includes at least a threshold count of target symbols.

In general, a backend system can determine various outcomes and perform operations for various types of supplemental features. A UI system can then output indications of those outcomes and perform operations for various types of supplemental features. For example, for various types of events, the backend system uses a RNG to generate a random number and maps the random number to an outcome using a lookup table. FIG. 3 shows examples of lookup tables 322A . . . 322N, which are also called weighted tables. In general, a lookup table can be implemented as any data structure that assigns probabilities to different options, in order for one of the different options to be selected using a random number. Different options are represented in different entries of a lookup table. The probabilities for different options can be reflected in threshold values (e.g., 0<RND<=40 for option 1, 40<RND<=70 for option 2, 70<RND<=90 for option 3, and 90<RND<=100 for option 4, given four options and a random number RND where 0<RND<=100). The threshold values can represent percentages or, more generally, subranges within the range for a random number. In some example implementations, the threshold values for a lookup table are represented as count values (weights) for the respective entries of the lookup table. For example, the following table shows count values for the four options described above:

TABLE 1

Example Lookup Table

| count value | entry |
|---|---|
| 40 | <value a1, value a2, . . .> |
| 30 | <value b1, value b2, . . .> |
| 20 | <value c1, value c2, . . .> |
| 10 | <value d1, value d2, . . .> |

The sum total of the count values (weights) indicates the range of the options. The backend system can use a random number, generated between 1 and the sum total of the count values, to select one of the entries in the lookup table by comparing the random number to successive running totals. In the example shown in Table 1, if the random number is 40 or less, the first entry is selected. Otherwise, if the random number is between 41 and 70, the second entry is selected. Otherwise, if the random number is between 71 and 90, the third entry is selected. Otherwise, the last entry is selected. The threshold values for a lookup table can be fixed and predetermined. Or, the threshold values for a lookup table can vary dynamically (e.g., depending on bet level). Or, a lookup table can be dynamically selected (e.g., depending on bet level, depending on another factor) from among multiple available lookup tables. Different parameters or choices during game play can use different lookup tables. Or, different combinations of parameters or choices can be combined in entries of a given lookup table.

In general, after reels have landed (stopped) in a reel area, any win conditions can be detected and any win amounts can be awarded to the player (e.g., credited to the player's credit balance). In some examples, win conditions depend on a count of target symbols in a reel area. In other examples, win conditions are defined as pay lines (also called win lines) across at least a portion of a reel area on a display screen. For a round of play, when a certain combination of symbols appears along a pay line, a win amount corresponding to that combination of symbols and that pay line is awarded. Win amounts can vary according to the combination of symbols and according to the particular pay line along which the combination of symbols appears. Win amounts are typically determined according to a pay table, where the pay table comprehends the various combinations of symbols and pay lines that may occur (i.e., the win conditions). The win amount for a round of play may be a fraction of an amount wagered for that round of play for certain win conditions. For other win conditions, the win amount may be much larger than the amount wagered. The number of pay lines and base credit cost to play depends on implementation. In some example implementations, there are 50 pay lines and a 150 credit cost. There are 2×, 3×, 4×, and 5× bet multipliers (also called bet levels), which sets a max bet of 650 credits. Multipliers can also appear as symbols in reels. Alternatively, there could be higher bet multipliers (e.g., up to 8×, with a max bet of 1200 credits), different credit options, and/or a different number of pay lines.

Instead of evaluating win conditions on pay lines across reels in a reel area, an award can be determined according to a "ways" approach. For example, a player may obtain a win entitlement by selecting a number of reels to play and an amount to wager per reel. The selection of a reel means that each displayed symbol of the reel (in the reel area) can be substituted for a symbol at one or more designated display positions. In other words, all symbols displayed at symbol display positions in the reel area for a selected reel can be used to form symbol combinations (one symbol per reel in a combination) with any of the symbols displayed at designated, symbol display positions of each of the other reels. For example, if there are five reels and three symbol display positions for each reel in a reel area (such that the symbol display positions comprise three rows of five symbol display positions), the symbol displayed in the center row is used for a non-selected reel, and the symbols displayed in all three rows are used for a selected reel. Each possible path through the designated (active) symbol display position(s) of the respective reels provides a way to win. As a result, the total number of ways to win is determined by multiplying the number of active display position(s) of each reel, where the active display position(s) for a reel are all display positions in the reel area for a selected reel but only the designated (e.g., center) display position in the reel area of a non-selected reel. As a result, for five reels and fifteen display positions, there are $3^5=243$ ways to win if five reels are selected, $3\times3\times3\times1\times1=27$ ways to win if three reels are selected, and so on.

IV. Boost Stage Using Metamorphic Graphical Element

This section describes various innovations in user interface ("UI") features of electronic gaming devices, as well as innovations in features of backend processing for electronic gaming devices to implement the UI features. In particular, the innovations relate to use of a boost stage with a metamorphic graphical element. In some example implementations, by providing visual feedback about how many times a predetermined condition such as a near-miss condition has occurred, the metamorphic graphical element improves usability of electronic gaming devices by enhancing the user experience for players, which potentially extends player time on the electronic gaming devices and maintains the interest of current players in the electronic gaming devices.

A. Introduction

In an electronic gaming device, a supplemental feature can be triggered upon satisfaction of a trigger condition. For example, the supplemental feature is a bonus reel game such as a hold-and-spin feature, a special mode that adds wild symbols, scatter symbols, or other symbols to reels of a base reel game, or another special mode.

A "near-miss" condition happens if the trigger condition for the supplemental feature is not satisfied but is "almost" satisfied. That is, the near-miss condition happens if the trigger condition is close to—within a threshold range of—being satisfied. In some example implementations, the trigger condition for a supplemental feature is a threshold count of target symbols in a set of reels, and the threshold range is z symbols less than the threshold count of target symbols for the trigger condition. For example, z is 1. After target symbols have landed in the reels (e.g., after the reels stop, or after target symbols have otherwise appeared), if the count of target symbols in the reels does not reach the threshold count, but is within z symbols the threshold count, the near-miss condition is satisfied. Alternatively, the trigger condition and near-miss condition can be defined in some other way. In general, a predetermined condition can be defined that causes a boost stage to start. For example, the predetermined condition can happen if a target symbol lands on a specific reel (e.g., first reel, last reel), or if a combination of target symbols lands on one or more specific reels.

A boost stage starts when predetermined condition such as a near-miss condition occurs, providing an additional opportunity to satisfy the trigger condition for the supplemental feature. In examples described herein, a boost stage has a metamorphic graphical element. In general, a metamorphic graphical element visually represents a random event or the occurrence of a random event. In examples described herein, the metamorphic graphical element represents the availability of a "second chance" in the boost stage. More specifically, the metamorphic graphical element can indicate how many times the predetermined condition has occurred in a relevant tracking period. Depending on implementation, the tracking period can be the time elapsed since the supplemental feature was last triggered from the boost stage, the time elapsed since the supplemental feature was last triggered from any stage, or some other period.

The metamorphic graphical element has a current state with any of multiple possible state values. The multiple possible state values can correspond to different counts of times the predetermined condition has occurred. Upon initialization or reset of the boost stage, the current state of the metamorphic graphical element is set to an initial state value. Thereafter, after entry into the boost stage, the current state of the metamorphic graphical element can advance to a higher state value, visually indicating the additional opportunity to satisfy the trigger condition for the supplemental feature. Depending at least in part on a random number generation event, the supplemental feature is selectively triggered. For example, depending at least in part on the random number generation event, a previous result (associated with the predetermined condition) is selectively enhanced to satisfy the trigger condition for the supplemental feature. If the supplemental feature is triggered, the metamorphic graphical element is reset. Otherwise, the boost stage finishes but the advanced, higher state value of the metamorphic graphical element is maintained for the boost stage.

Figure 4A:
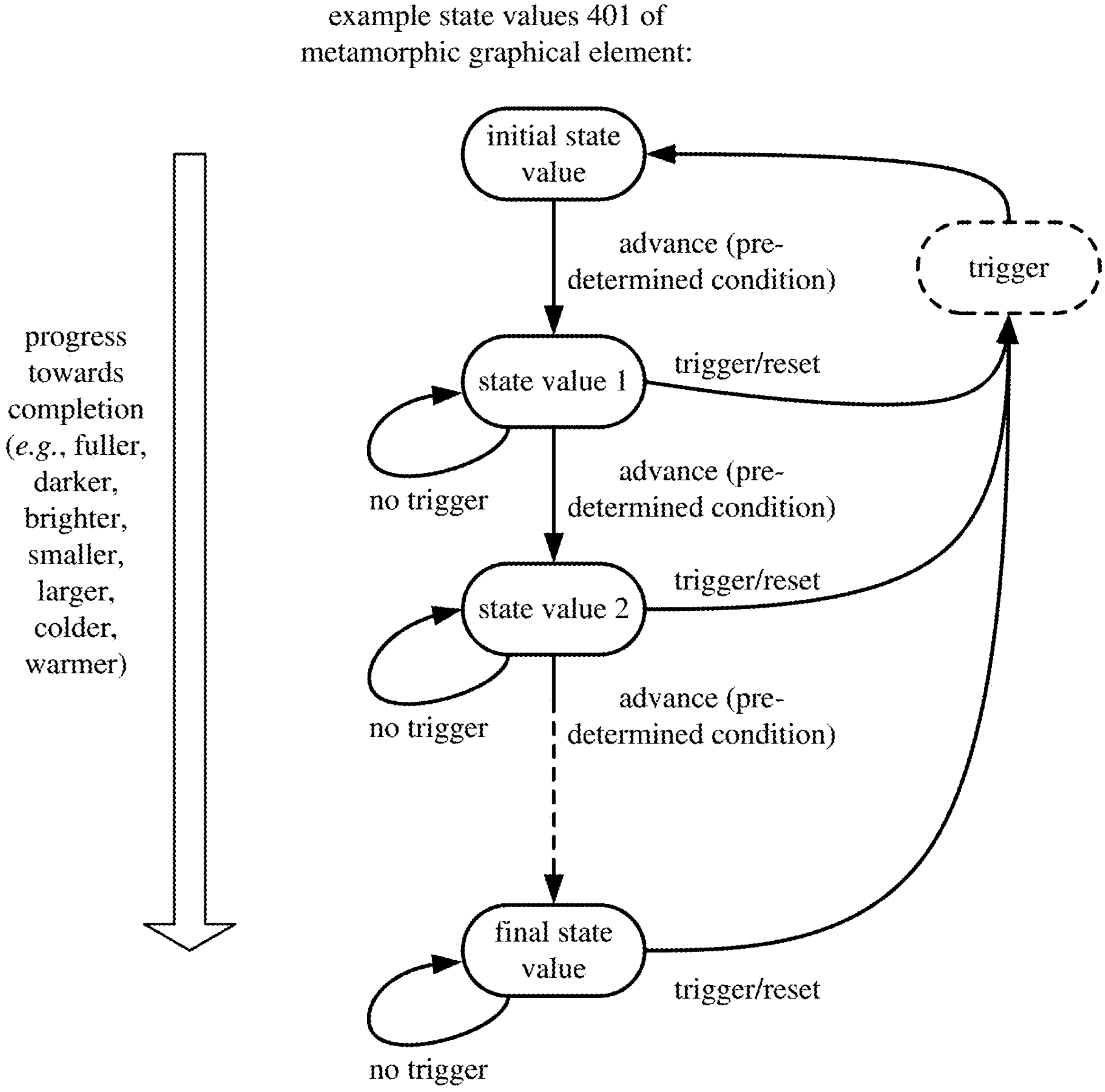
FIGS. 4*a* and 4*b* are diagrams showing example state values and state transitions for a metamorphic graphical element in a boost stage.

FIG. 4*a* shows example state values 401 and state transitions for a metamorphic graphical element in a boost stage. The number of state values for the metamorphic graphical element depend on implementation. In FIG. 4*a*, the example state values 401 include an initial state value and a final state value, as well as one or more state values between the initial state value and the final state value. Upon initialization or reset, the state of the metamorphic graphical element is the initial state value. Thereafter, when the predetermined condition (e.g., near-miss condition) occurs, the state of the metamorphic graphical element advances to the next higher state value, as shown in FIG. 4*a*, until the final state value is reached. The state of the metamorphic graphical element stays at the final state value until the supplemental feature is eventually triggered.

As shown in FIG. 4*a*, during the boost stage, a decision is made regarding whether the supplemental feature is triggered or not triggered. If the supplemental feature is not triggered, the state of the metamorphic graphical element is unchanged. (This is shown as the "no trigger" path from the respective state values 401 after the initial state value.) If the supplemental feature is triggered, the metamorphic graphical element is reset. That is, the state of the metamorphic graphical element switches back to the initial state value. When the supplemental feature is triggered, the metamorphic graphical element can temporarily switch to a trigger state, which may be accompanied by an animation indicating the supplemental feature has been triggered. Alternatively, the metamorphic graphical element can be implemented without having an intermediate trigger state, e.g., by having a separate trigger animation. For example, when the supplemental feature is triggered, an animation transitioning to the supplemental feature is shown. Subsequently, the supplemental feature obscures the metamorphic graphical element when operations are performed for the supplemental feature. After the supplemental feature completes, the metamorphic graphical element is shown with its state set to the initial state value. Or, as another alternative, different trigger states/animations can be applied when transitioning from different states 401 of the metamorphic graphical element.

Figure 4B:
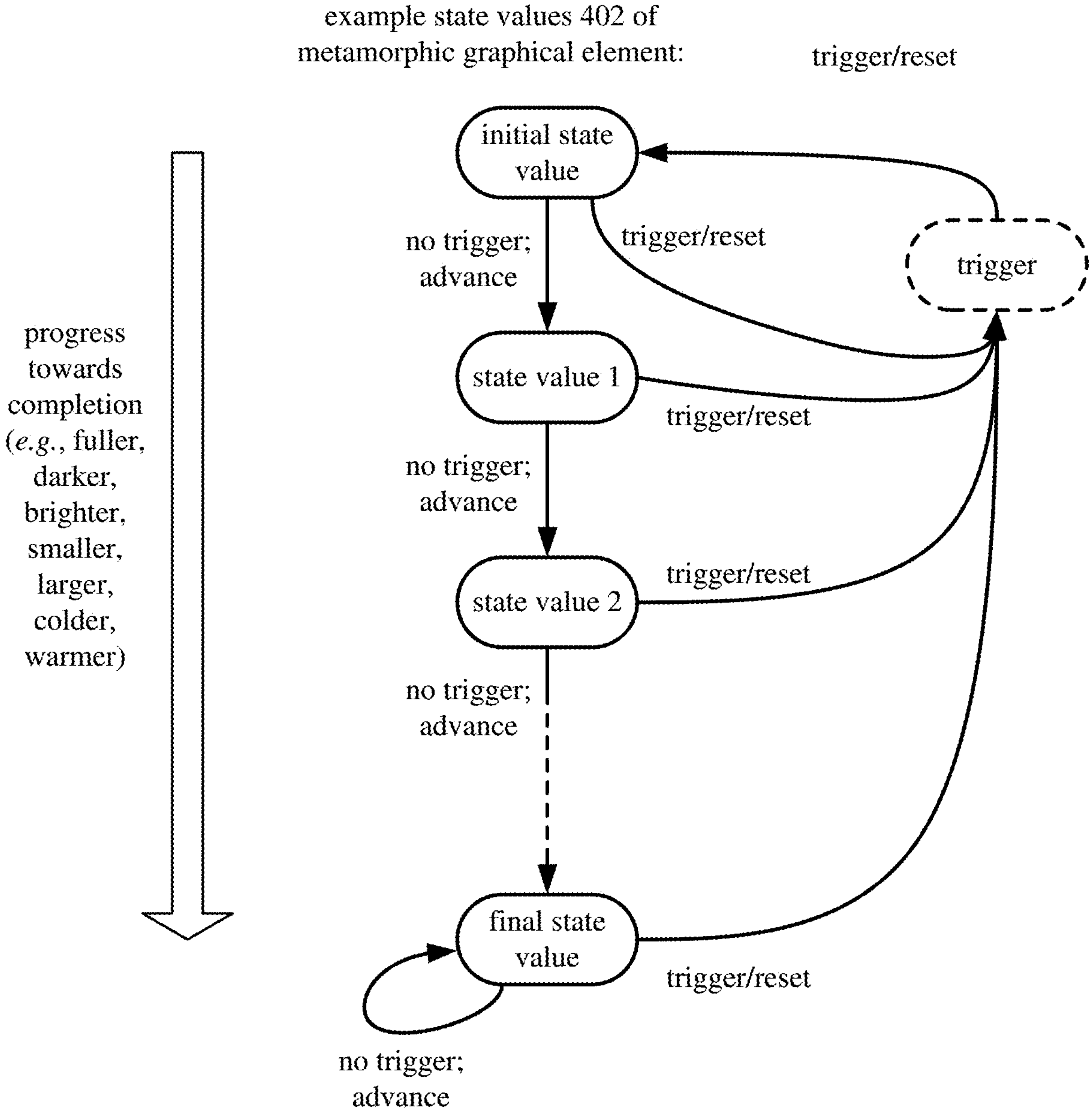

FIG. 4*b* shows example state values 402 and state transitions for a metamorphic graphical element in a boost stage, with alternative timing for the state transitions. The number of state values for the metamorphic graphical element depend on implementation, as explained with reference to FIG. 4*a*. Upon initialization or reset, the state of the metamorphic graphical element is the initial state value. Thereafter, when the predetermined condition (e.g., near-miss condition) occurs, a decision is made regarding whether the supplemental feature is triggered or not triggered. If the supplemental feature is not triggered, the state of the metamorphic graphical element advances to the next higher state value, as shown in FIG. 4*b*, at least until the final state value is reached. (This is shown as the "no trigger" path from the respective state values 402.) If the supplemental feature is triggered, the metamorphic graphical element is reset. That is, the state of the metamorphic graphical element switches back to the initial state value. As explained with reference to FIG. 4*a*, when the supplemental feature is triggered, the metamorphic graphical element can temporarily switch to a trigger state, which may be accompanied by an animation indicating the supplemental feature has been triggered, or the metamorphic graphical element can be implemented without having an intermediate trigger state, e.g., by having a separate trigger animation. Different trigger states/animations can be applied when transitioning from different states 402 of the metamorphic graphical element. Thus, the state of the metamorphic graphical element selectively resets or advances to the next higher state value, as shown in FIG. 4*b*, until the final state value is reached. The state of the metamorphic graphical element stays at the final state value until the supplemental feature is eventually triggered.

The example state values 401, 402 of the metamorphic graphical element are associated with different depictions of the metamorphic graphical element. As shown in FIGS. 4*a* and 4*b*, the example state values 401 generally follow a progression towards completion, starting from the initial state value and ending at the final state value. In some example implementations, the metamorphic graphical element is a bowl, bag, or other container, and the multiple state values for the metamorphic graphical element correspond to different levels of fullness of the container. Upon initialization or reset of the boost stage, the container is empty or has minimal fullness. Thereafter, after entry into the boost stage, the container can advance to a higher fullness, at least until a maximal fullness has been reached. The final state value is associated with a depiction of the container as full or overflowing. Alternatively, the state values could follow a progression along decreasing levels of fullness, with the initial state value associated with a depiction of the container as full or overflowing, and the final state value associated with a depiction of the container as empty or nearly empty. Or, as another alternative, for a different metamorphic graphical element, the state values could follow a progression along increasing levels of brightness (e.g., dark to bright), decreasing levels of brightness (e.g., bright to dark), increasing levels of size (e.g., small to large), decreasing levels of size (e.g., large to small), increasing levels of graphically-depicted "temperature" (e.g., cold to hot), decreasing levels of temperature (e.g., hot to cold), or some other levels of progression.

B. Example Metamorphic Graphical Elements for a Boost Stage

Figure 5A:
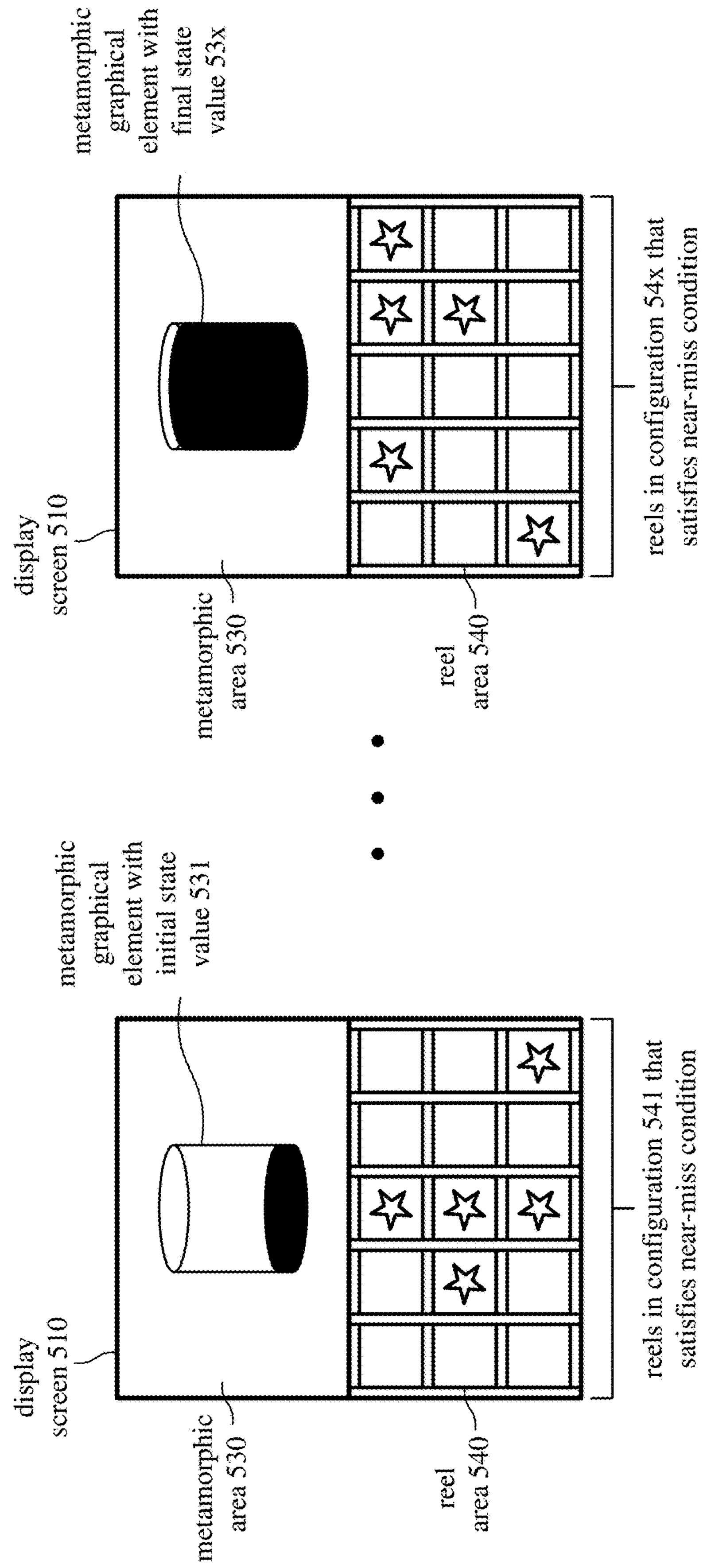
FIGS. 5*a*-5*c* are diagrams showing examples of transitions for a metamorphic graphical element during one or more boost stages.
Figure 5B:
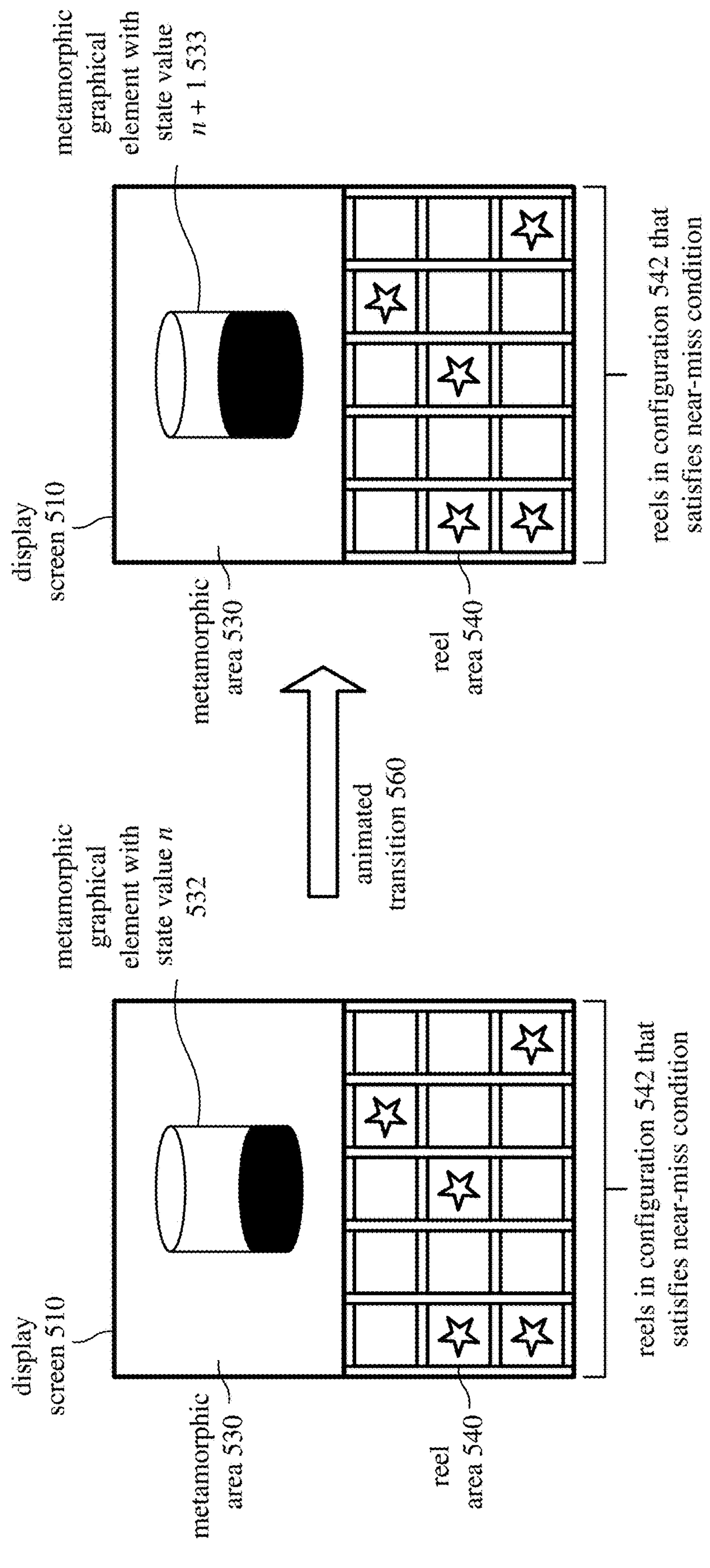
Figure 5C:
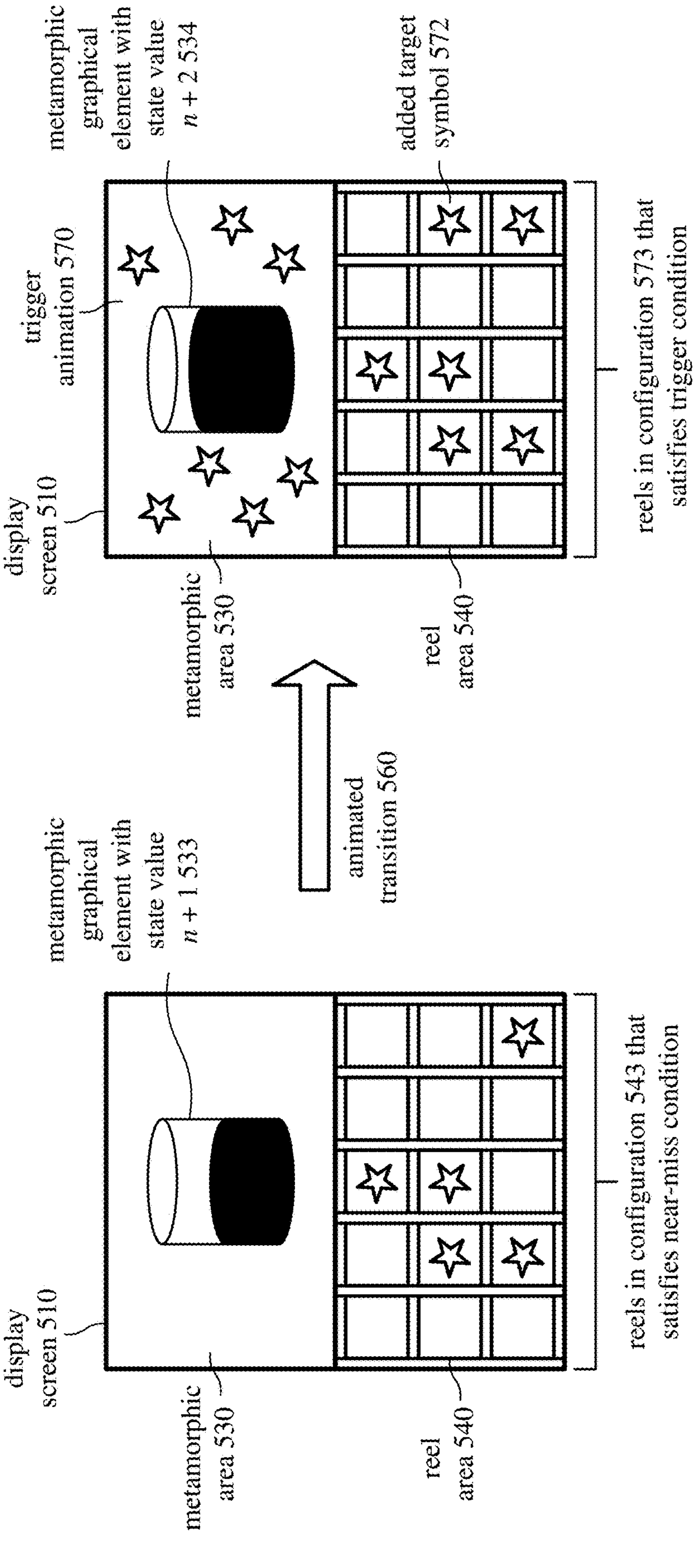

FIGS. 5*a*-5*c* are diagrams that represent example screen shots of a display screen of an electronic gaming device, showing different states of an example metamorphic graphical element for a boost stage. The screen shots may be rendered on a main display screen, secondary display screen, or other display screen of an electronic gaming device. In particular, FIGS. 5*a*-5*c* show a metamorphic area 530 and reel area 540 on a display screen 510.

The reel area 540 encloses viewable portions of a set of reels associated with the reel area 540 for a hold-and-spin feature. In FIGS. 5*a*-5*c*, the reel area 540 encloses viewable portions of 15 reels. For each of the 15 reels, the viewable portion of the reel includes one position for a symbol. The symbol set for the reels has various types of symbols, including target symbols (shown as star symbols) and other symbols. In FIGS. 5*a*-5*c*, symbols other than target symbols are not shown. Alternatively, the reel area 540 can have some other configuration of reels (different dimensions) and/or have different types of symbols, as described in Section III. Also, in alternative implementations, a reel area used for a boost stage and supplemental feature can include reels for a base reel game or include reels for a bonus reel game other than a hold-and-spin feature. Also, although not shown in FIGS. 5*a*-5*c*, the display screen 510, or one or more other display screens, can include one or more other reel areas associated with different sets of reels. For example, in some example implementations described below, target symbols are graphically "transferred" from a set of physical reels, or another set of reels in a different reel area, into the reel area 540 upon the satisfaction of certain conditions. In this way, target symbols can be transferred into the reel area 540 as a positive outcome for a result in that other set of reels.

In FIGS. 5*a*-5*c*, the metamorphic area 530 includes a metamorphic graphical element. The metamorphic graphical element has a current state with any of multiple possible state values, corresponding to different depictions of the metamorphic graphical element on a progression from an initial state value to a final state value. FIG. 5*a* illustrates a progression of the metamorphic graphical element for different levels of fullness, from a minimally-full state to a maximally-full state. Alternatively, the metamorphic graphical element follows a different progression from the initial state value to the final state value, as described in the previous section.

In the examples shown in FIGS. 5*a*-5*c*, the predetermined condition is a near-miss condition defined to be a count of five target symbols, which is one less than the trigger condition (at least six target symbols). In the left part of FIG. 5*a*, the reel area 540 includes reels in a configuration 541 that satisfies the near-miss condition. The left part of FIG. 5*a* shows the metamorphic graphical element with an initial state value 531. In the right part of FIG. 5*a*, the reel area 540 includes reels in a configuration 54× that satisfies the near-miss condition, after a later play. The right part of FIG. 5*a* shows the metamorphic graphical element with a final state value 53×, after one or more state transitions from the initial state value.

During the boost stage, a random number is generated and, using a lookup table, mapped to an outcome. In the examples shown in FIGS. 5*a*-5*c*, during the boost stage, based on a random number generation event, a target symbol is selectively added or not added to reels in the reel area 540, which selectively enhances the result associated with the near-miss condition. If the target symbol is added to the reels in the reel area 540, the trigger condition is satisfied, so the supplemental feature is triggered and the metamorphic graphical element is reset. On the other hand, if the target symbol is not added to the reels in the reel area 540, the trigger condition is still not satisfied, and the advanced, higher state value of the metamorphic graphical element is retained.

In FIG. 5*b*, the boost stage is started when the reel area 540 includes reels in a configuration 542 that satisfies the near-miss condition, after a later play. The metamorphic graphical element with state value n 532 advances into the metamorphic graphical element with state value n+1 533. The change in the current state of the metamorphic graphical element can be visually depicted with an animated transition 560. In the example shown in FIG. 5*b*, based on a random number generation event, a target symbol is not added to the reels in the reel area 540. Therefore, the trigger condition is still not satisfied, and the state value n+1 of the metamorphic graphical element is retained.

In FIG. 5*c*, the boost stage is started when the reel area 540 includes reels in a configuration 543 that satisfies the near-miss condition, after a later play. The metamorphic graphical element with state value n+1 533 advances into the metamorphic graphical element 534 with state value n+2 534. The change in the current state of the metamorphic graphical element can be visually depicted with an animated transition 560. In the example shown in FIG. 5*c*, based on a random number generation event, a target symbol is added to the reels in the reel area 540. With the added target symbol 572, the reels are in a configuration 573 that satisfies the trigger condition. A trigger animation 570 in the metamorphic area 530 visually emphasizes the triggering of the supplemental feature due to the addition of the target symbol. Subsequently (not shown in FIG. 5*c*), the metamorphic graphical element is reset.

The examples shown in FIGS. 5*b* and 5*c* have been described as following the timing of state transitions shown in FIG. 4*a*. Alternatively, the examples shown in FIGS. 5*b* and 5*c* can follow the timing of state transitions shown in FIG. 4*b*, with the state of the metamorphic graphical element advancing to a higher state after (and only upon the occurrence of) a determination that a target symbol is not added to the reels in the reel area 540.

FIGS. 5*a*-5*c* show a near-miss condition defined as five target symbols. Alternatively, the near-miss condition could be at least three target symbols, at least four target symbols, or some other number of target symbols. In this case, the boost stage can selectively add/not add enough target symbols to satisfy the trigger condition. Or, the predefined condition that triggers the boost stage can be defined in some other way.

C. Example Electronic Gaming Devices Using a Boost Stage With a Metamorphic Graphical Element In some example implementations, a boost stage with a metamorphic graphical element is implemented in a physical reel stepper machine. In the physical reel stepper machine, target symbols are selectively transferred from physical reels to video reels. For example, when a scatter symbol lands in a physical reel, one or more target symbols appear in the corresponding video reel. Or, when a stack of target symbols lands in a physical reel, a stack of target symbols appears in the corresponding video reel. The appearance of one or more target symbols in the video reels can be accompanied by an animation that emphasizes the addition of the target symbol(s) to the video reels (e.g., to "push up" target symbols to the video reels). In such example implementations, the trigger condition and near-miss condition depend on count of target symbols in the video reels. When the supplemental feature is triggered, the supplemental feature uses the video reels.

Alternatively, a boost stage with a metamorphic graphical element can be implemented in some other type of electronic gaming device. For example, a boost stage with a metamorphic graphical element can be implemented in an electronic gaming device that lacks physical reels, e.g., with a trigger condition, near-miss condition or other predetermined condition, and supplemental feature involving reels in a reel area on a display screen. The supplemental feature can be a bonus reel game or a special mode of a base reel game. Or, as another example, a boost stage with a metamorphic graphical element can be implemented in an electronic gaming device that provides a non-reel game, with a trigger condition, near-miss condition or other predetermined condition, and supplemental feature being integrated into the non-reel game.

In general, for a "thick client" implementation, an electronic gaming device (such as a gaming device 104A-X in FIG. 1 or gaming device 200 in FIG. 2) stores computer-executable instructions for controlling one or more games in local memory of the electronic gaming device and executes those instructions in one or more local processors of the electronic gaming device. In such a "thick client" implementation, a game controller of the electronic gaming device conducts one of the game(s) and manages various interfaces of the electronic gaming device to receive player inputs and commands. Or, as another example, for a "thin client" implementation, computer-executable instructions for controlling one or more games are stored in memory of a gaming server (e.g., central determination gaming system server or other remote host) and executed in one or more processors of the gaming server. The gaming server remotely controls one of the game(s) over a network, and the electronic gaming device displays screens for the game and manages interfaces to receive player inputs and commands.

D. Example Screenshots of Boost Stage Using Metamorphic Graphical Element

FIGS. 6*a*-6*h* show example screen shots 601-608 of a display screen 610 of an electronic gaming device, for different state values of a metamorphic graphical element, according to one example implementation. The screen shots 601-608 represent time instances of game play of a reel game having a boost stage with a metamorphic graphical element, from the time the metamorphic graphical element has a state value n through the time a supplemental feature (hold-and-spin feature) is triggered from the boost stage.

In FIGS. 6*a*-6*h*, the display screen 610 shows a jackpot area 620, a metamorphic area 630, and a reel area 640. Additional areas (not shown) of the display screen 610 can present other information, such as the current bet level, an overall win amount for a play, and remaining credits. The border area of the display screen 610 can also display supplemental information such as a base denomination for the game.

The metamorphic area 630 includes a metamorphic graphical element, which is a Chinese-themed "good luck" bowl of coins. The metamorphic graphical element has one of 8 state values, which correspond to different levels of fullness for the bowl. The reel area 640 encloses viewable portions of 15 reels associated with the reel area 640 for the hold-and-spin feature. For each of the 15 reels, the viewable portion of the reel includes one position for a symbol. The symbol set for the reels includes target symbols, which are shown as coin symbols with credit values. Symbols other than target symbols are not shown. The trigger condition is satisfied when the reel area 640 encloses at least six target symbols. The predetermined condition is a near-miss condition that is satisfied when the reel area 640 encloses five target symbols.

In the examples shown in FIGS. 6*a*-6*h*, when the near-miss condition occurs (five target symbols in the reel area 640), the bowl is filled with additional coins, which visually indicates a change in the state of the metamorphic graphical element. For example, when the reel area 640 encloses five target symbols (coins with credit values) after a play, additional coins are added to the bowl, because the near-miss condition is satisfied. In this case, the boost stage starts, giving a "second chance" to trigger the supplemental feature. The changing state of the metamorphic graphical element (addition of coins to the bowl) indicates the occurrence of the second chance. On the other hand, when the reel area 640 encloses six or more target symbols after a play, the supplemental feature (hold-and-spin feature) is directly triggered, but the state of the metamorphic graphical element (bowl) is unchanged. When the reel area 640 encloses fewer than five target symbols after a play, the near-miss condition is not satisfied. In this case, the boost stage is skipped (the supplemental feature cannot be triggered, even with a second chance), and the state of the metamorphic graphical element (bowl) is unchanged.

During the boost stage, a random number is generated (sometimes called a RNG pull). The random number is mapped, using a lookup table, to a decision about whether to add a $6^{th}$ target symbol to the reel area. If the $6^{th}$ target symbol is awarded, the $6^{th}$ target symbol is added to a randomly-selected open position in the reel area 640, and the supplemental feature is triggered. Subsequently, the metamorphic graphical element (bowl) is reset. If the $6^{th}$ target symbol is not awarded, the supplemental feature is not triggered, and play continues with the metamorphic graphical element (bowl) unchanged. Thus, the metamorphic graphical element visually indicates, as the fullness of the bowl, how many times the near-miss condition has been satisfied, and how many times the boost stage has been entered, without triggering the supplemental feature from the boost stage.

Figure 6A:
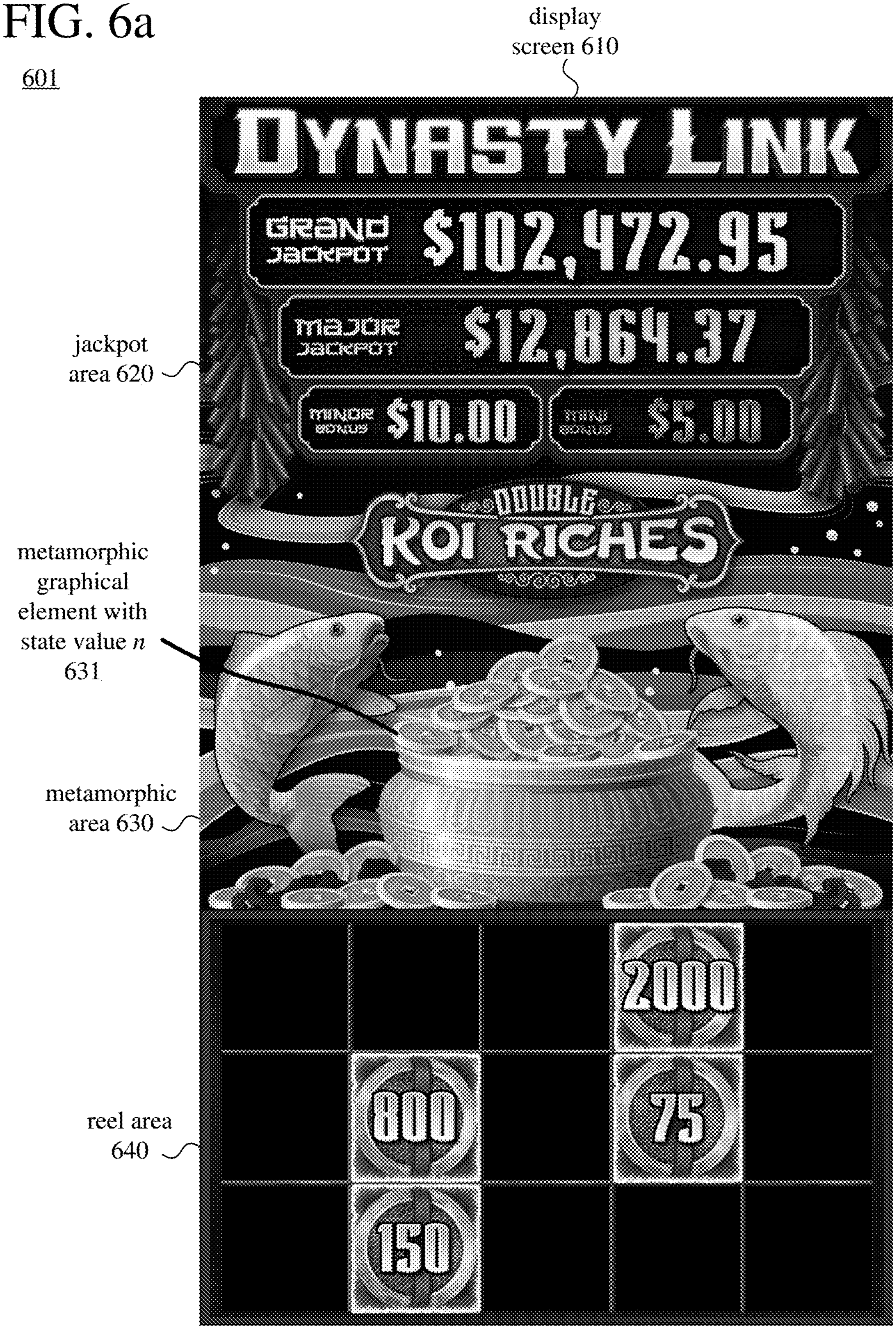
FIGS. 6*a*-6*h* are screenshots showing an example metamorphic graphical element with different state values.

Specifically, the screenshot 601 in FIG. 6*a* shows the metamorphic graphical element with state value n 631. At this point, the reel area 640 encloses four target symbols, so the near-miss condition is not satisfied.

Figure 6B:
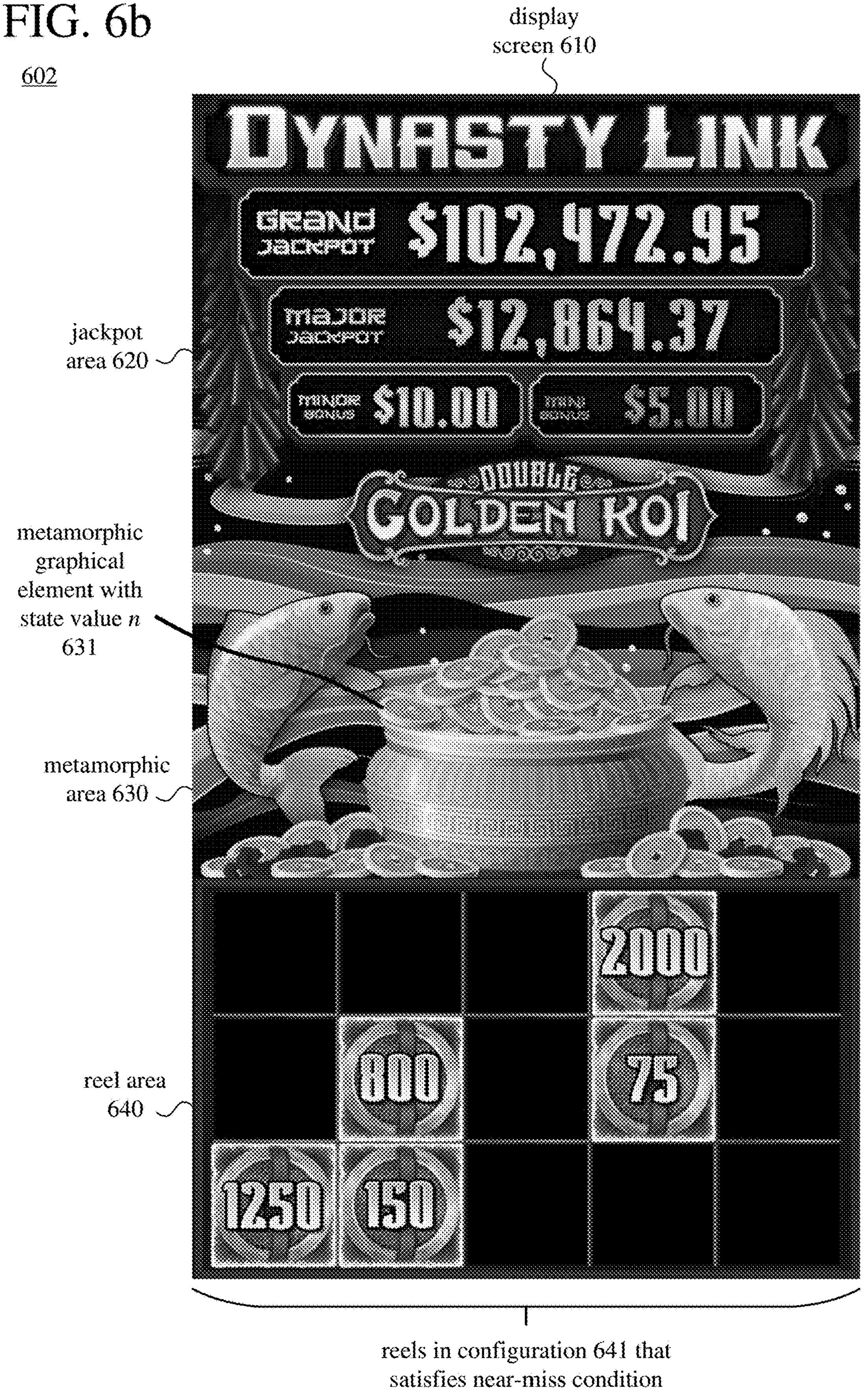
Figure 6C:
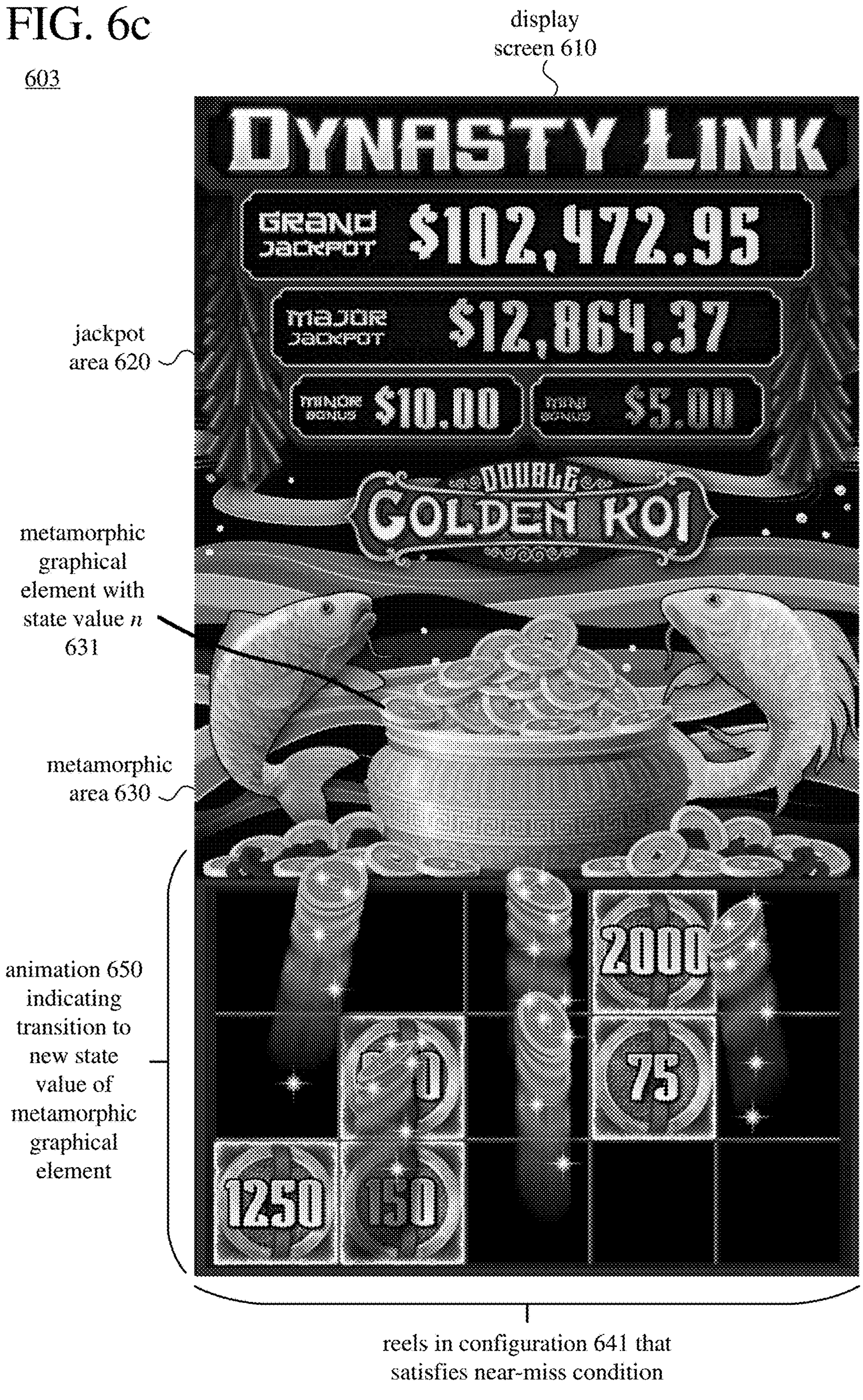
Figure 6D:
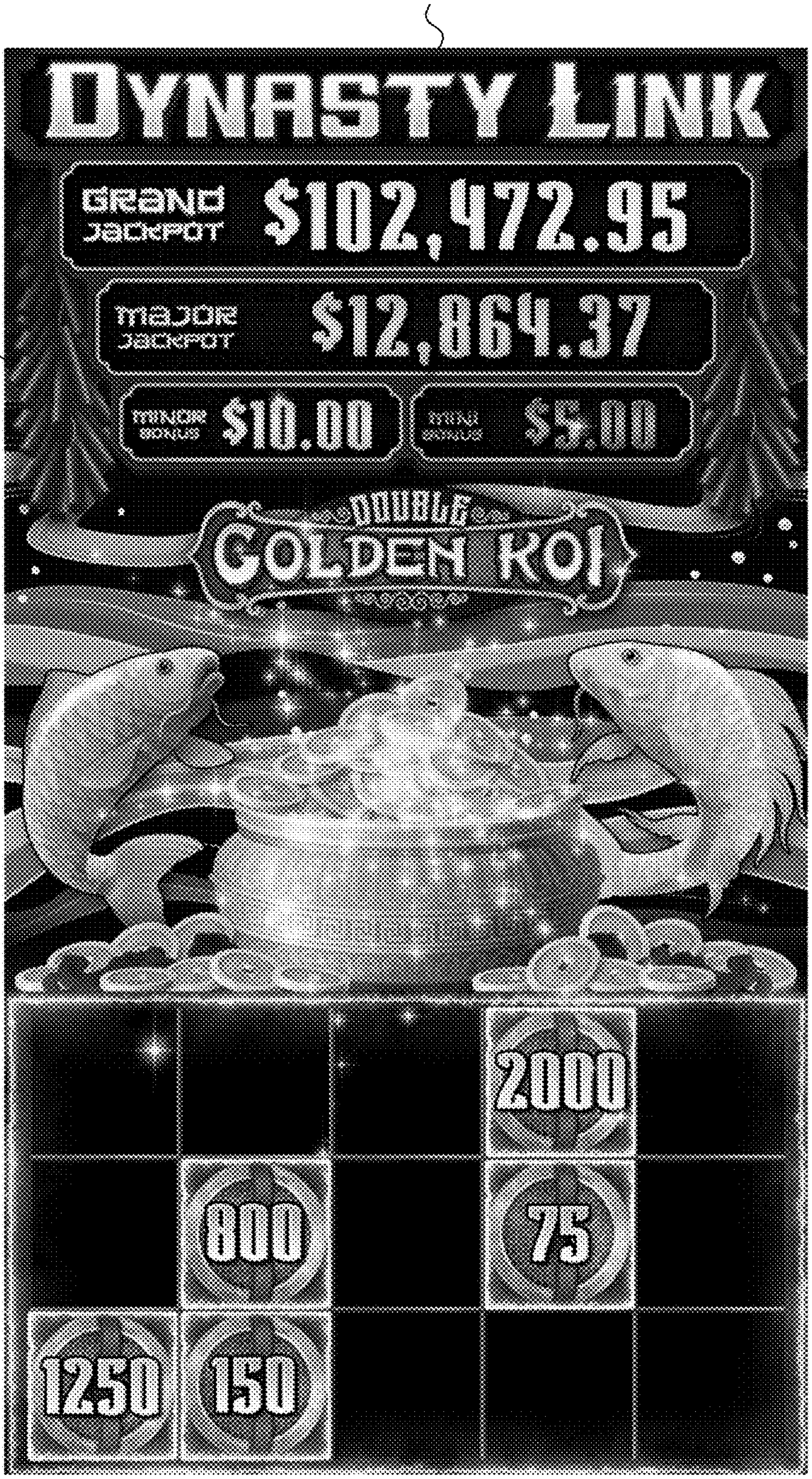
Figure 6E:
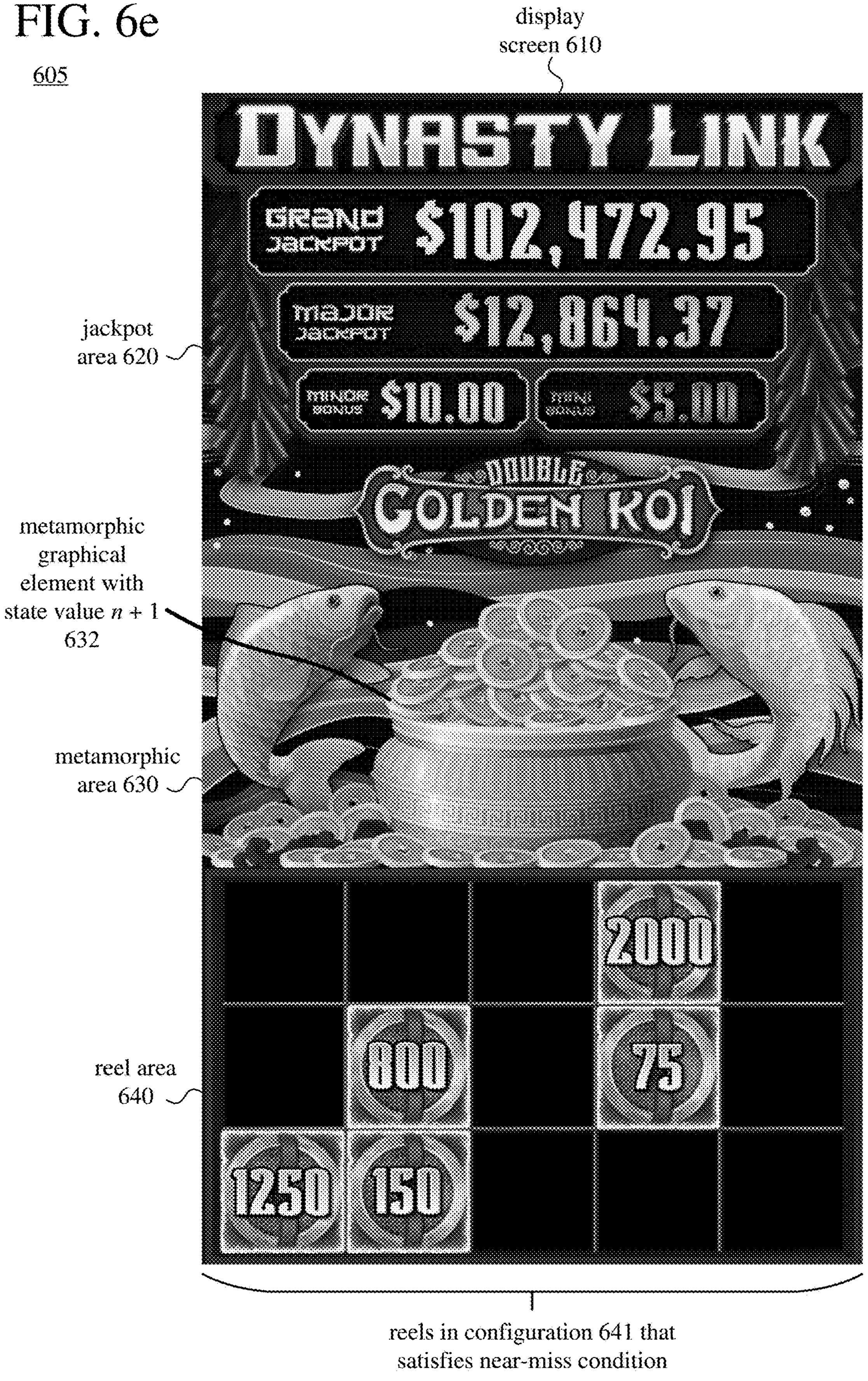

The screenshot 602 in FIG. 6*b* shows the display screen 610 after a subsequent play. The reel area 640 now includes reels in a configuration 641 that satisfies the near-miss condition. The reel area 640 encloses five target symbols. As shown in the screenshots 603 and 604 in FIGS. 6*c* and 6*d*, the satisfaction of the near-miss condition is visually emphasized with an animation 650 indicating a transition to a new state value of the metamorphic graphical element. A generic animation (with coins pushed up to the bowl) is used when transitioning to any higher state value. Alternatively, different animations can be used when transitioning to/from different state values. As shown in the screenshot 605 in FIG. 6*e*, as the animation 650 finishes (with a particle burst effect), the metamorphic graphical element snaps to the next higher state value n+1 632. This is shown by the bowl being more full than before.

Figure 6F:
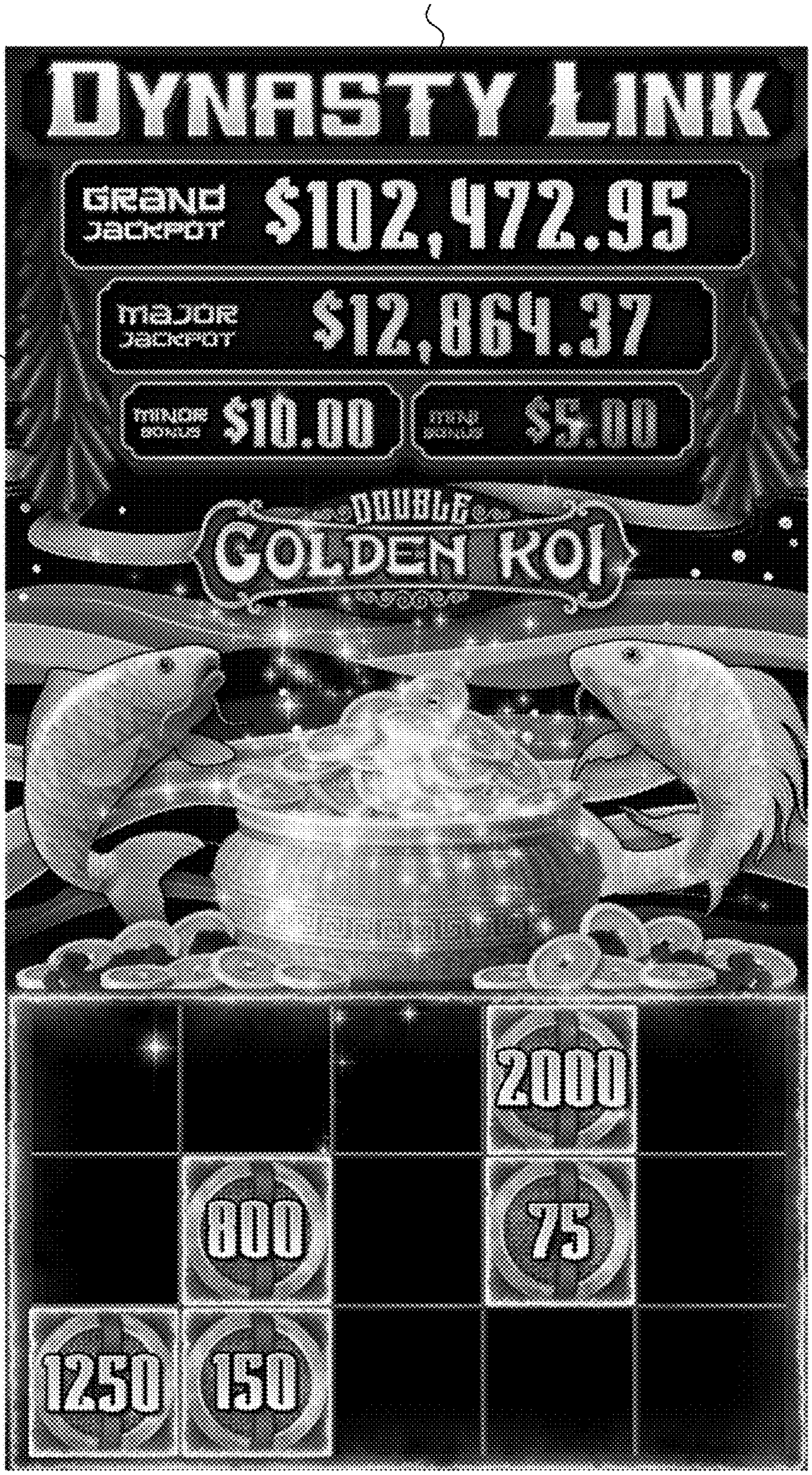
Figure 6G:
Figure 6H:
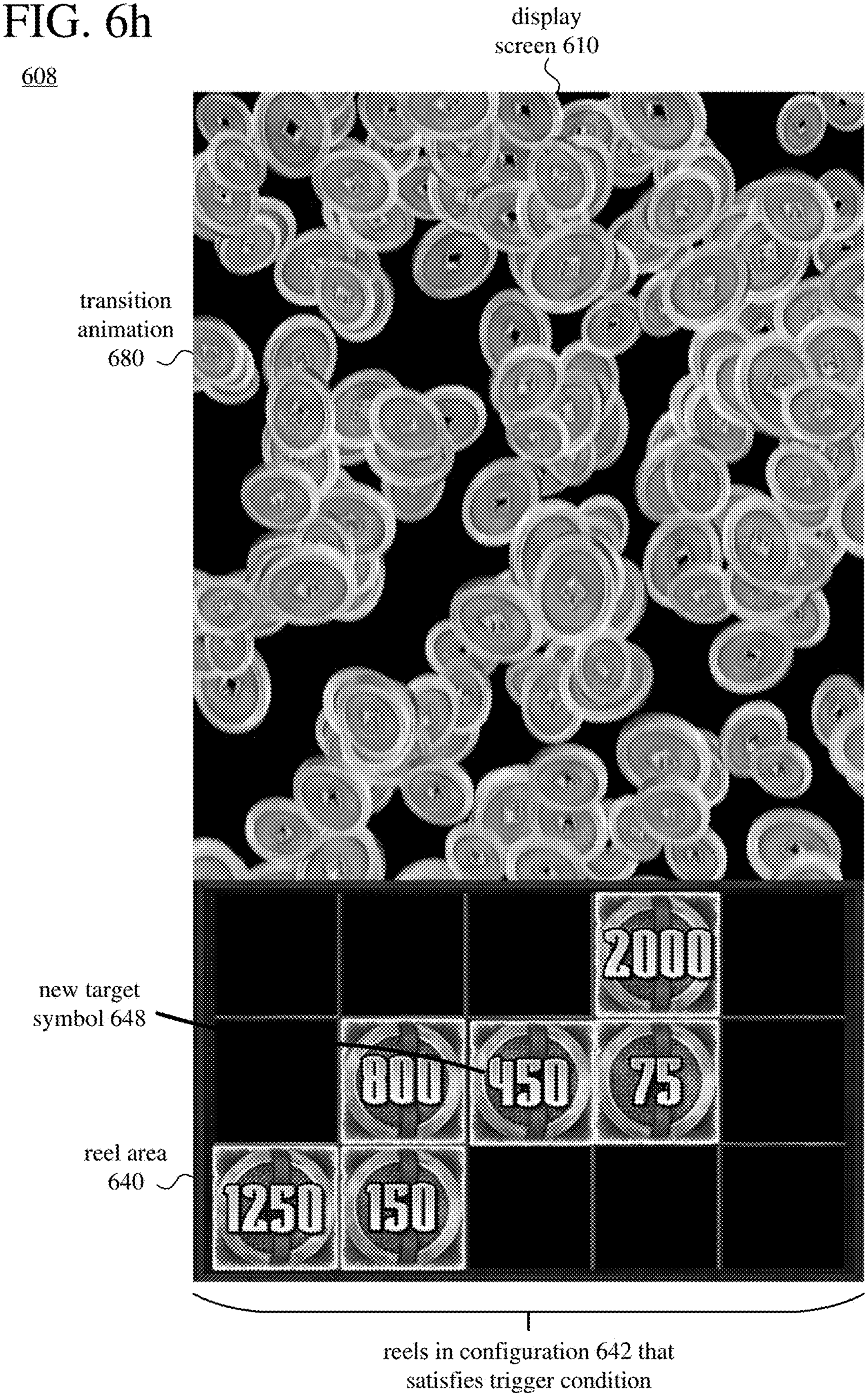

The screenshots 606, 607, 608 in FIGS. 6*f*, 6*g*, and 6*h* show transitions when the supplemental feature is triggered from the boost stage. An animation 660 indicates a transition to the supplemental feature. In particular, after a particle burst effect, the animation 660 shows a new target symbol dropping from the metamorphic area 630 to the reel area 640, where the new target symbol 648 is added to an open position. The reel area 640 now includes reels in a configuration 642 that satisfies the trigger condition. That is, the reel area 640 encloses six target symbols. Finally, the jackpot area 620 and metamorphic area 630 are covered by a transition animation 680, which visually emphasizes the transition to the supplemental feature (hold-and-spin feature in the reel area 640). The transition animation 680 obscures the metamorphic graphical element (bowl). After the supplemental feature (hold and spin feature) completes, the metamorphic graphical element appears again (not shown in FIGS. 6*a*-6*h*) with its state reset to the initial state value, which can be depicted by the bowl being empty or having a minimal fullness.

E. Variations with State of Metamorphic Graphical Element Affecting Outcomes

In many of the examples described in the preceding sections, the current state of the metamorphic graphical element does not affect the likelihood of the supplemental feature being triggered from the boost stage. The current state of the metamorphic graphical element is not tied to random number generation events, lookup table selection, or mapping operations.

Alternatively, the chance of the supplemental feature being triggered from the boost stage can change depending on the current state of the metamorphic graphical element. For example, triggering of the supplemental feature can be made progressively more likely as the state of the metamorphic graphical element advances to higher state values. For the initial state value, the chance of triggering the supplemental feature has a lowest probability. For successively higher state values, the chance of triggering the supplemental feature has progressively higher probabilities. For the final state value, the chance of triggering the supplemental feature has a highest probability. Alternatively, the current state of the metamorphic graphical element can affect the likelihood of the supplemental feature being triggered from the boost stage in some other way.

A state-adaptive approach can be implemented by using different lookup tables for the boost stage depending on the state value of the metamorphic graphical element. For example, different state values of the metamorphic graphical element are associated with different lookup tables for the boost stage, with the different lookup tables reflecting different probabilities that a previous result (for the near-miss condition or other predetermined condition) is enhanced, that the supplemental feature is triggered, etc. Or, a state-adaptive approach can be implemented by otherwise changing how random numbers are generated or mapped to outcomes for the boost stage.

When the current state of the metamorphic graphical element affects the likelihood of the supplemental feature being triggered from the boost stage, RTP per play can be balanced by adjusting other aspects of gameplay. For example, if triggering of the supplemental feature is progressively more likely as the state of the metamorphic graphical element advances to higher state values, the probability of satisfying the near-miss condition can decrease by corresponding amounts as the state of the metamorphic graphical element advances to higher state values. This can be done, for example, by using different reels (that tend to add target symbols at different rates, to satisfy a trigger condition or near-miss condition) as the current state of the metamorphic graphical element changes. In this way, the overall RTP can stay at least roughly constant between plays, regardless of the state of the metamorphic graphical element.

Compared to approaches in which the state of a metamorphic graphical element does not affect the likelihood of the supplemental feature being triggered, implementing a state-adaptive approach can be more complicated. In addition to tracking the state of the metamorphic graphical element, a backend system ties different state values to different lookup tables, different operations, etc. Also, to the extent RTP is balanced between plays, adjustments to other elements of gameplay may present additional challenges in implementation and evaluation.

F. Variations with Automatic Triggering of Supplemental Feature

In many of the examples described in the preceding sections, a supplemental feature is not automatically triggered from the boost stage at any point, even when the metamorphic graphical element reaches a final state value. At the final state value, the supplemental feature is still selectively triggered depending on a random number generation event.

Alternatively, with a so-called “true-persistence” approach, the supplemental feature is automatically triggered from the boost stage when the metamorphic graphical element reaches a final state value. The true-persistence approach can be implemented in conjunction with a state-adaptive approach (as described in section IV.E) or non-adaptive approach. In a true-persistence approach, the current state of the metamorphic graphical element can be checked for the boost stage before a random number is generated. If the current state is the highest state value, the previous result (associated with the near-miss condition or other predetermined condition) is enhanced, the supplemental feature is triggered, and the metamorphic graphical element is reset. Otherwise (the current state is not yet the highest state value), the supplemental feature is selectively triggered from the boost stage depending on a random number generation event.

In a true-persistence approach, RTP per play can be balanced by adjusting other aspects of gameplay. For example, the probability of satisfying the near-miss condition can be decreased when the state of the metamorphic graphical element reaches the next-to-final state value. This can be done, for example, by using different reels (that tend to add target symbols at a lower rate, to satisfy a trigger condition or near-miss condition) when the current state of the metamorphic graphical element reaches the next-to-final state value. In this way, the overall RTP can stay at least roughly constant between plays, even if the supplemental feature is automatically triggered from the boost stage when the metamorphic graphical element reaches the final state value.

G. Variations with No Enhancement of Previous Result

In many of the examples described in the preceding sections, the result associated with a near-miss condition or other predetermined condition is selectively enhanced from the boost stage. If the supplemental feature is triggered from the boost stage, the result associated with the near-miss condition or other predetermined condition is enhanced, thereby satisfying the trigger condition for the supplemental feature.

Alternatively, a supplemental feature can be selectively triggered from the boost stage without ever enhancing the result associated with the near-miss condition or other predetermined condition. For example, when the supplemental feature is triggered from the boost stage, no target symbol is added to a reel area. Instead, play transitions directly to the supplemental feature. Such skipped-enhancement variations can be implemented in combination with other variations described herein, e.g., state-adaptive variations and/or true-persistence variations.

In such skipped-enhancement variations, RTP can be balanced by adjusting other aspects of gameplay. In particular, for some types of supplemental features such as a hold-and-spin feature, the expected return from the supplemental feature improves if the result associated with the near-miss condition is not enhanced before starting the supplemental feature. In other words, the expected return is better when starting the supplemental feature from the near-miss condition than when starting the supplemental feature from the trigger condition. (For the hold-and-spin feature, this holds true because respins are more likely to be awarded when there are more open positions.) To compensate, the expected return can be adjusted to be at least roughly the same whether the supplemental feature starts from the near-miss condition or a trigger condition. This can be done, for example, by adjusting lookup tables or reels.

H. Multiplayer Variations

In many of the examples described in the preceding sections, the current state of a metamorphic graphical element for a boost stage is advanced or reset depending on activity by a single player at a single electronic gaming device. That is, the metamorphic graphical element is not shared among players at multiple electronic gaming devices.

Alternatively, the current state of a metamorphic graphical element can be adjusted from any of multiple electronic gaming devices. In other words, a player at any of the multiple electronic gaming devices can contribute to the progression of the metamorphic graphical element from the initial state value towards the final state value, and the supplemental feature can be triggered from the boost stage for any of the multiple electronic gaming devices. In this way, the metamorphic graphical element is communal or shared between the players at the multiple electronic gaming devices.

Depending on implementation, the supplemental feature, when triggered, can be allocated to a player at only one of the multiple electronic gaming devices (winner takes all). Or, the supplemental feature, when triggered, can be distributed among players at the multiple electronic gaming devices, e.g., in proportion to contributions from the respective players, or in proportion to "coin-in" at the respective devices during the relevant tracking period. By adjusting or selecting among lookup tables, the chance of a player triggering the supplemental feature can vary depending on that player's contribution.

The multiplayer variations of the metamorphic graphical element can be implemented in combination with other variations described herein, e.g., state-adaptive variations, true-persistence variations, and/or skipped-enhancement variations.

Example Techniques for Using Boost Stage with Metamorphic Graphical Element

Figure 7A:
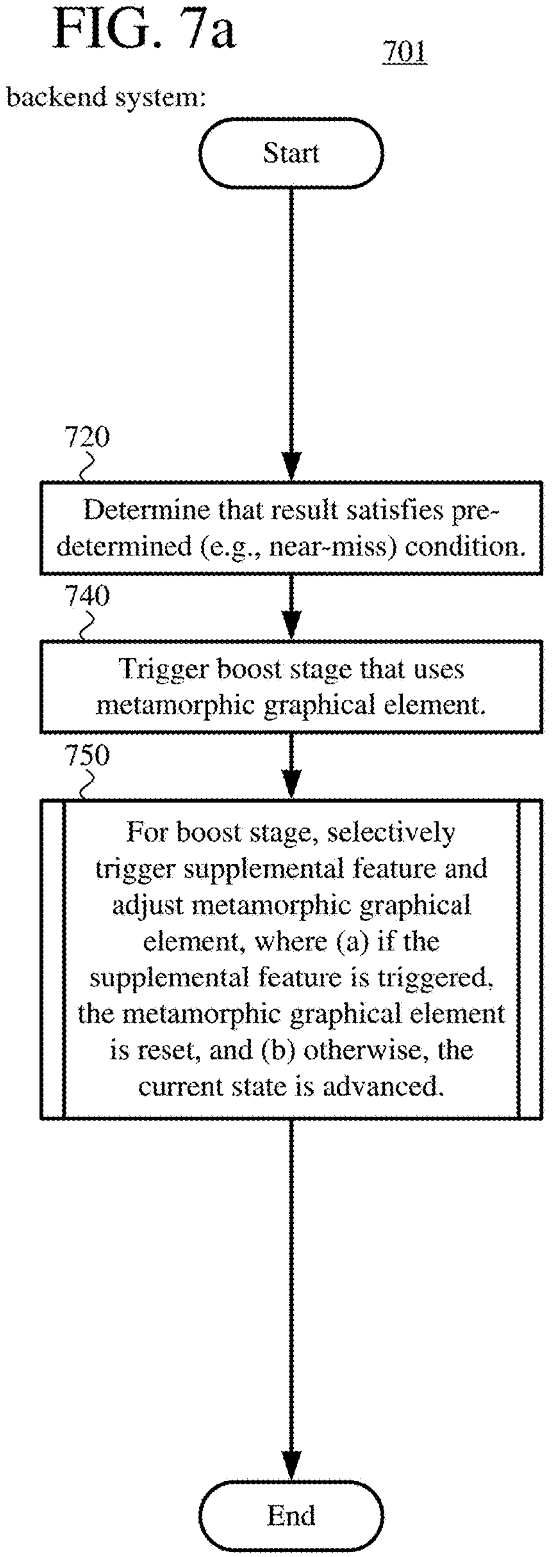
FIG. 7*a* is a flowchart showing an example technique for controlling the UI of an electronic gaming device, focusing on backend operations.
Figure 7B:
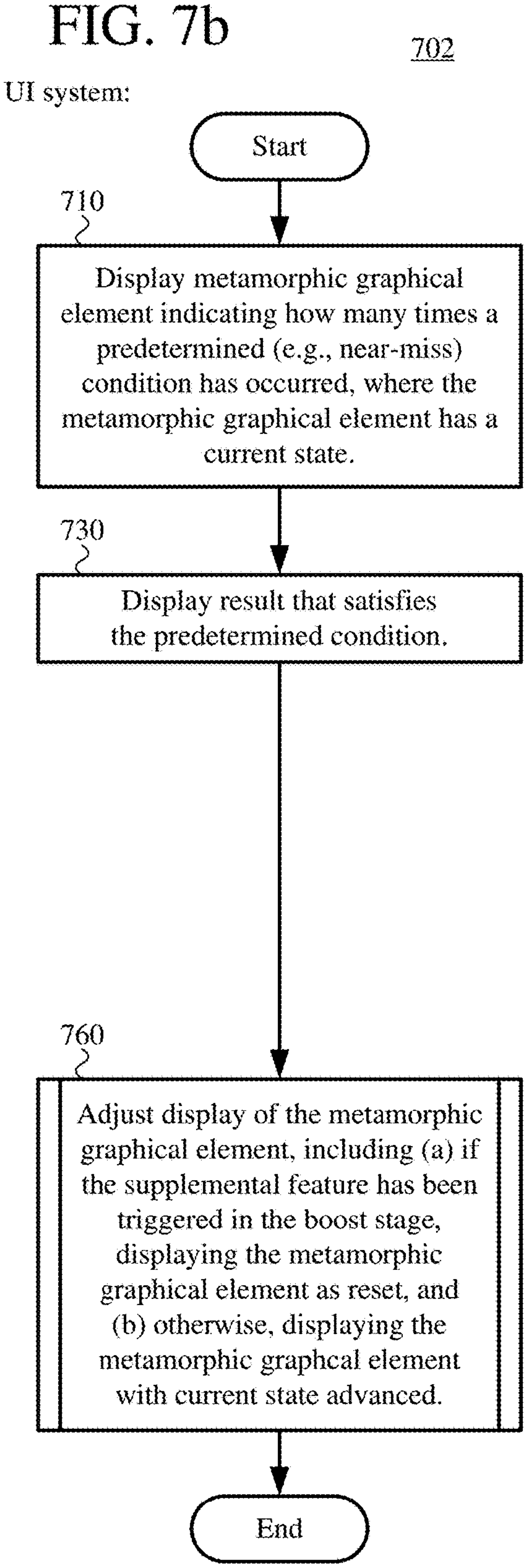
FIG. 7*b* is a flowchart showing an example technique for controlling the UI of an electronic gaming device, focusing on UI-frontend operations.

FIGS. 7*a* and 7*b* show different aspects of controlling a user interface ("UI") of an electronic gaming device such as an electronic gaming machine ("EGM") to use a boost stage with a metamorphic graphical element. In particular, FIG. 7*a* shows an example technique 701 for using a boost stage with a metamorphic graphical element, from the perspective of a backend. Operations of the example technique 701 shown in FIG. 7*a* can be performed, for example, in a game processing backend system 314 explained with reference to FIG. 3. FIG. 7*b* shows an example technique 702 for using a boost stage with a metamorphic graphical element, from the perspective of a UI frontend. Operations of the example approach 707 shown in FIG. 7*a* can be performed, for example, in a UI system 302 explained with reference to FIG. 3. The game processing backend system and UI system can be implemented using memory and one or more processors that are part of the electronic gaming device and/or part of a gaming system located remotely from the electronic gaming device. Depending on implementation, the backend system and UI system can be implemented by software executable on a CPU, by software controlling special-purpose hardware (e.g., a GPU or other graphics hardware for video acceleration), and/or by special-purpose hardware (e.g., in an ASIC), to process game play instructions in accordance with game play rules, determine outcomes in accordance with game play rules, and/or generate outputs (e.g., to one or more display screens and/or speakers).

In general, the techniques 701, 702 shown in FIGS. 7*a* and 7*b* use one or more reel areas on one or more display screens of an electronic gaming device. The reel area(s) can be displayed on a single display screen (e.g., main display screen, or secondary display screen). Or, the reel areas(s) can be split among multiple display screens (e.g., one reel area on a first display screen, and a reel area on a second display screen). The number of reel areas depends on implementation. As used herein, the term "game window" or "reel area" can be used interchangeably.

The techniques 701, 702 shown in FIGS. 7*a* and 7*b* can count target symbols for a trigger condition or near-miss condition. The target symbols depend on implementation. In some example implementations, the target symbols are credit symbols. The credit symbols can have dynamic values, which are assigned when reels are configured. In this way, different credit symbols can have different values but still be counted as target symbols. Alternatively, the target symbols can be credit symbols that have predefined values (not dynamic values) that may be different for different target symbols. Or, the target symbols can be credit symbols that have the same value. Or, the target symbols can be wild symbols or some other type of symbol. Or, for the techniques 701, 702 shown in FIGS. 7*a* and 7*b*, the predetermined condition can be defined in some other way (e.g., a target symbol landing on a specific reel, or a combination of target symbols landing on one or more specific reels).

In some example implementations, the electronic gaming device is electronic gaming machine with physical reels and video reels, which uses a "stepper" mechanism to transfer, or at least create the appearance of transfer of, symbols from the physical reels to corresponding video reels. In such example implementations, target symbols are selectively added to the video reels depending on results for the physical reels, and the near-miss condition is a count of target symbols in the video reels.

1. Example Backend Operations

With reference to FIG. 7*a*, at stage 720, a backend system (such as the game processing backend system 314 described with reference to FIG. 3) determines a result that satisfies a predetermined condition (e.g., near-miss condition) for a supplemental feature. For example, the supplemental feature is a bonus reel game. Alternatively, the supplemental feature can be a special mode that adds wild symbols to the reels of a base reel game, a special mode that adds scatter symbols to the reels of a base reel game, or another special mode. Or, the result can be from some other type of process, and the supplemental feature can be a special mode for that process.

In general, a near-miss condition is satisfied when the result fails to satisfy a trigger condition for the supplemental feature but is within a threshold range of satisfying the trigger condition. For example, the trigger condition is a threshold count of target symbols in a set of reels, and the threshold range is a difference relative to the threshold count. In some example implementations, the trigger condition is a threshold count of 6 target symbols in a set of reels, and the threshold range is 1 coin less than the threshold count. Alternatively, the trigger condition and threshold range can be defined in some other way, depending on implementation.

At stage 740, in response to the determination that the result satisfies the predetermined condition, the backend system triggers a boost stage that uses a metamorphic graphical element. The metamorphic graphical element indicates how many times the predetermined condition has occurred during a tracking period. For example, the tracking period restarts whenever the supplemental feature is triggered in the boost stage. In this case, the metamorphic graphical element indicates how many times the predetermined condition has occurred since the supplemental feature was last triggered in the boost stage. Alternatively, the tracking period restarts whenever the supplemental feature is triggered. In this case, the metamorphic graphical element indicates how many times the predetermined condition has occurred since the supplemental feature was last triggered.

The metamorphic graphical element has a current state with any of multiple state values. For example, the multiple state values include an initial state value that corresponds to an initial depiction of the metamorphic graphical element, as well as multiple progressively-changing state values that correspond to successive depictions of the metamorphic graphical element. Sections IV.A and IV.B describes examples of state values for metamorphic graphical elements. In some example implementations, the metamorphic graphical element is a container such as a pot, bowl, bag, or cup. The initial depiction shows the container empty or with a minimal amount of content, while the successive depictions show the container with successively larger amounts of content. Conversely, the initial depiction can show the container full or with a maximal amount of content, while the successive depictions show the container with successively smaller amounts of content. More generally, the successive depictions (for the progressively-changing state values) show the metamorphic graphical element at different stages of completion along a progression from the initial depiction to a final depiction, which is associated with a final state value among the multiple progressively-changing state values.

At stage 750, for the boost stage, the backend system selectively triggers the supplemental feature and adjusts the metamorphic graphical element. In particular, if the supplemental feature is triggered in the boost stage, the metamorphic graphical element is reset. To reset the metamorphic graphical element, the backend system can change the current state of the metamorphic graphical element to an initial state, set a variable that indicates the boost stage has been reset, or perform some other operations to designate the metamorphic graphical element as reset or change the metamorphic graphical element. Otherwise (the supplemental feature not being triggered in the boost stage), the current state of the metamorphic graphical element is advanced to a next state value, if any, among the multiple state values. For example, when there is a final, highest state value, the backend system determines whether the current state is a highest state value. If the current state is the highest state value, the backend system makes no change to the current state. Otherwise (the current state not being the highest state value), the backend system adjusts the current state to have the next state value. Alternatively, in some implementations, there can always be a next state value among the multiple state values.

Figure 7E:
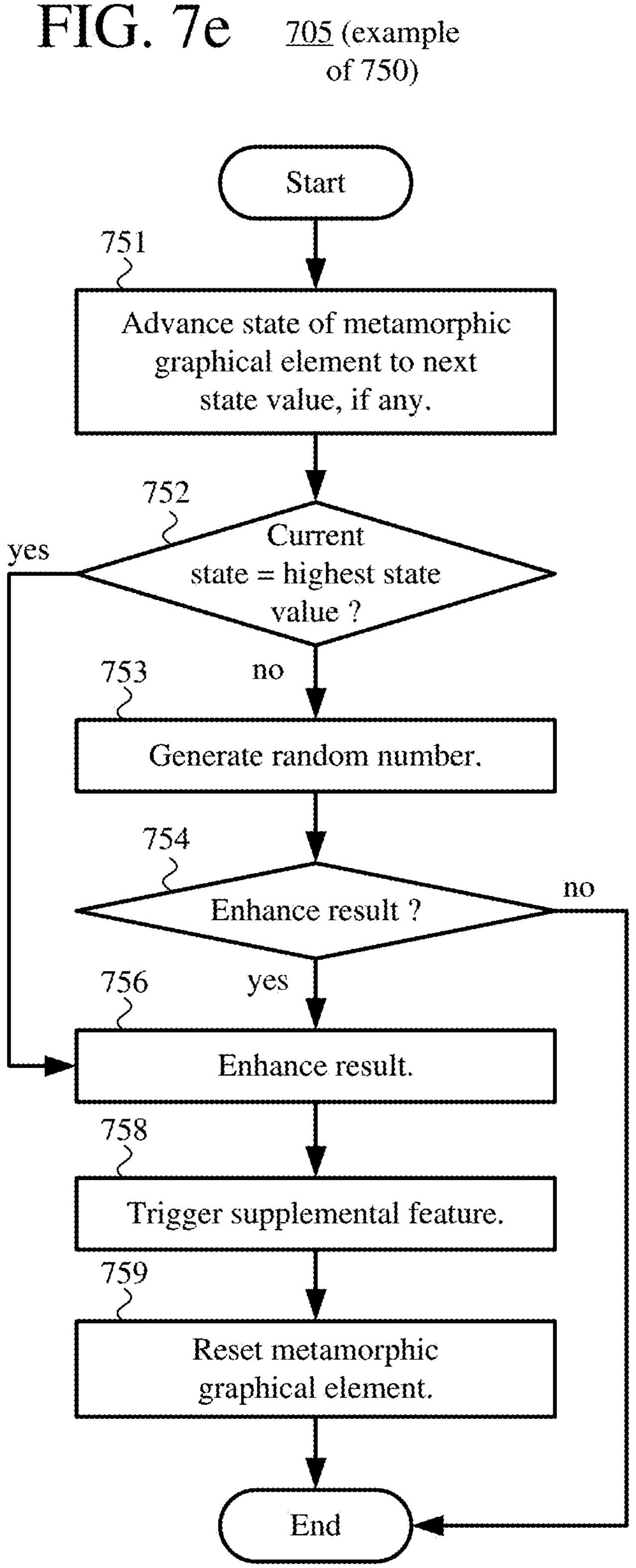

FIGS. 7*c*, 7*e*, and 74 show alternative approaches for performing backend operations when selectively triggering a supplemental feature and adjusting a metamorphic graphical element for a boost stage. In the approaches 703, 705 shown in FIGS. 7*c* and 7*e*, respectively, the current state is advanced to the next state value, if any, among the multiple state values before selectively triggering of the supplemental feature for the boost stage. Thus, if the supplemental feature is triggered in the boost stage, the metamorphic graphical element is reset after the current state is advanced to the next state value, if any, among the multiple state values. In contrast, in the approach 706 shown in FIG. 7*f*, the current state is advanced to the next state value, if any, among the multiple state values after a determination, for the boost stage, that the supplemental feature is not triggered.

With reference to FIG. 7*c*, at stage 751, the backend system advances the state of the metamorphic graphical element to the next state value, if any, among the multiple available state values. At stage 753, the backend system generates a random number with a random number generator. Based at least in part on a result of a lookup operation for the random number in a lookup table, the backend system determines whether or not to trigger the supplemental feature. The backend system can determine whether or not to trigger the supplemental feature without selectively enhancing the result (associated with the predetermined condition—e.g., near-miss condition) based on the result of the lookup operation, such that the supplemental feature is directly triggered or not triggered. In the approach shown in FIG. 7*c*, however, the backend system selectively enhances the result (associated with the predetermined condition) based on the result of the lookup operation. At stage 754, based at least in part on a result of a lookup operation for the random number in a lookup table, the backend system determines whether or not to enhance the result associated with the predetermined condition and, if so, enhances the result (stage 756). In this case, the supplemental feature is triggered (stage 758), and the metamorphic graphical element is reset (stage 759). At this point, the backend system can also determine a position at which to indicate the selectively-enhanced result (e.g., randomly select a position at which to add a target symbol). Thus, if the selectively-enhanced result satisfies the trigger condition, the supplemental feature is triggered, the metamorphic graphical element is reset, and the boost stage exits. Otherwise (the selectively-enhanced result not satisfying the trigger condition), the current state remains advanced to the next state value, if any, among the multiple state values (stage 751), and the boost stage exits without resetting the metamorphic graphical element.

The approach 705 shown in FIG. 7*e* is mostly the same as the approach 703 shown in FIG. 7*c*, but the result (associated with the predetermined condition—e.g., near-miss condition) is automatically enhanced if the current state of the metamorphic graphical element is the highest state value. At stage 752, the backend system determines whether or not the current state of the metamorphic graphical element is a highest state value. If the current state is the highest state value, the backend system triggers the supplemental feature. In FIG. 7*e*, if the current state is the highest state value, the backend system enhances the result (stage 756). Otherwise (the current state being less than the highest state value), the backend system generates a random number (stage 753) and, based at least in part on a result of a lookup operation for the random number in a lookup table, determines whether or not to trigger the supplemental feature, as described with reference to FIG. 7*c*.

The approach 706 shown in FIG. 7*f* is mostly the same as the approach 703 shown in FIG. 7*c*, but the current state is selectively advanced to the next state value after a determination, for the boost stage, that the supplemental feature is not triggered. In particular, if the result associated with the predetermined condition is not enhanced (at stage 754), the backend system advances the current state of the metamorphic graphical element to the next state value, if any, among the multiple state values (stage 755), and the boost stage exits without resetting the metamorphic graphical element.

In the approaches shown in FIGS. 7*c*, 7*e*, and 7*f*, the random number is generated using the gaming RNG 318 described with reference to FIG. 3, and the lookup table is one of the lookup tables 322A-322N described with reference to FIG. 3. Thus, the backend system evaluates the random number against entries in one of the lookup tables 322A-322N. The lookup table includes entries indicating options for whether or not to enhance the result associated with the predetermined condition (e.g., near-miss condition). Alternatively, the lookup table can more directly include entries indicating options for whether or not to trigger the supplemental feature. In some example implementations, the lookup table does not change depending on the current state of the metamorphic graphical element, bet level, or other factors. Thus, the same lookup table is used regardless of the current state of the metamorphic graphical element and bet level. Alternatively, depending on the current state of the metamorphic graphical element, the lookup table can dynamically change, or one of multiple available lookup tables can be selected. In this way, the likelihood of triggering the supplemental feature (directly, or by enhancing the result associated with the predetermined condition) can change depending on the current state of the metamorphic graphical element. As another option, depending on bet level, the lookup table can dynamically change, or one of multiple available lookup tables can be selected. In this way, the likelihood of triggering the supplemental feature (directly, or by enhancing the result associated with the predetermined condition) can change depending on the bet level.

2. Example Frontend Operations

With reference to FIG. 7*b*, at stage 710, a UI system (such as the UI system 302 described with reference to FIG. 3) displays a metamorphic graphical element. The metamorphic graphical element indicates how many times a predetermined condition (e.g., near-miss condition) for a supplemental feature has occurred during a tracking period. For example, as described with reference to FIG. 7*a*, the tracking period restarts whenever the supplemental feature is triggered in a boost stage, or the tracking period restarts whenever the supplemental feature is triggered. The metamorphic graphical element has a current state with any of multiple state values that correspond to depictions of the metamorphic graphical element, as described with reference to FIG. 7*a*.

At state 730, the UI system displays a result that satisfies the predetermined condition for the supplemental feature. For example, the supplemental feature is a bonus reel game. Alternatively, the supplemental feature can be a special mode that adds wild symbols to the reels of a base reel game, a special mode that adds scatter symbols to the reels of a base reel game, or another special mode. Or, the result can be from some other type of process, and the supplemental feature can be a special mode for that process. In general, a near-miss condition is satisfied when the result fails to satisfy a trigger condition for the supplemental feature but is within a threshold range of satisfying the trigger condition, as described with reference to FIG. 7*a*.

At stage 760, for a boost stage triggered in response to a determination that the result satisfies the predetermined condition, the UI system adjusts display of the metamorphic graphical element. In particular, if the supplemental feature has been triggered in the boost stage, the UI system displays the metamorphic graphical element as reset. Otherwise (the supplemental feature not having been triggered in the boost stage), the UI system displays the metamorphic graphical element with the current state advanced to a next state value, if any, among the multiple state values. For example, when there is a final, highest state value, if the current state is the highest state value, the UI system makes no change to the current state. Otherwise (the current state not being the highest state value), the UI system adjusts the current state to have the next state value. Alternatively, in some implementations, there can always be a next state value among the multiple state values.

FIGS. 7*d* and 7*g* show alternative approaches for performing UI frontend operations when adjusting a metamorphic graphical element for a boost stage. In the approach 704 shown in FIG. 7*d*, the current state is advanced to the next state value, if any, among the multiple state values before the result (associated with the predetermined condition—e.g., near-miss condition) is enhanced. Thus, if the result is enhanced in the boost stage, the metamorphic graphical element is reset after the current state is advanced to the next state value, if any, among the multiple state values. In contrast, in the approach 707 shown in FIG. 7*g*, the current state is advanced to the next state value, if any, among the multiple state values only after the result is enhanced in the boost stage.

With reference to FIG. 7*d*, at stage 761, the UI system displays the metamorphic graphical element with its current state advanced to the next state value, if any, among the multiple available state values. If the result (associated with the predetermined condition) is enhanced (decision at stage 764), the UI system displays the enhanced result (stage 766) (adding a target symbol at a randomly-selected position), transitions to the supplemental feature (stage 768), and displays the reset metamorphic graphical element (stage 769), before exiting the boost stage. Otherwise (the result is not enhanced), the UI system exits the boost stage without any reset of the metamorphic graphical element.

The approach 707 shown in FIG. 7*g* is mostly the same as the approach 704 shown in FIG. 7*d*, but the UI systems displays the metamorphic graphical element with its current stage advanced to the next state value, if any, among the multiple state values (stage 765) only if the supplemental feature is not triggered. In particular, if the result (associated with the predetermined condition) is not enhanced (at stage 764), the UI system displays the metamorphic graphical element with its current state advanced to the next state value, if any, among the multiple available state values (stage 765), and the boost stage exits without any reset of the metamorphic graphical element.

J. Example of Integration into Electronic Gaming Devices

Innovations described herein can be implemented in a gaming server 102 and/or gaming device 104A, 104B, 104C, 104X, 200 described with reference to FIGS. 1 and 2. Thus, a gaming server 102 or gaming device 104A, 104B, 104C, 104X, 200 is an example of an electronic gaming device as described in section IV.

For example, for the electronic gaming device, a game controller such as a game controller 202 described with reference to FIG. 2 can perform operations to use a boost stage with a metamorphic graphical element. In some example implementations, the game controller 202 performs backend operations as well as frontend UI operations. With respect to frontend UI operations, the game controller 202 can control display of a metamorphic graphical element and control display of a result that satisfies a predetermined condition. Further, for a boost stage triggered in response to a determination that the result satisfies the predetermined condition, the game controller 202 can adjust the display of the metamorphic graphical element. In particular, the game controller 202 can, if the supplemental feature has been triggered in the boost stage, control display of the metamorphic graphical element as reset, and otherwise control display of the metamorphic graphical element with the current state advanced to a next state value. With respect to backend operations, the game controller 202 can determine that a result satisfies a predetermined condition for a supplemental feature. In response, the game controller 202 can trigger a boost stage that uses a metamorphic graphical element. For the boost stage, the game controller 202 can selectively trigger the supplemental feature and adjust a metamorphic graphical element. In particular, the game controller 202 can, if the supplemental feature is triggered in the boost stage, reset the metamorphic graphical element, and otherwise advance the current state of the metamorphic graphical element to a next state value.

Innovations described in Section IV can be implemented in a game processing pipeline that follows the example game processing architecture 300 described with reference to FIG. 3. As described with reference to FIG. 3, RNG conversion engine 320 utilizes one or more lookup tables 322A-322N. In the context of the innovations described herein, for example, one or more of the lookup tables 322A-322N can be used to determine whether a result (associated with a predetermined condition) is enhanced for a boost stage, or otherwise be used to determine whether a supplemental feature is triggered for a boost stage. In some variations, different lookup tables can be used for different state values of a metamorphic graphical element, so as to adjust the likelihood of the supplemental feature being triggered from the boost stage.

In general, the example game processing architecture 300 shown in FIG. 3 can be used to process game play instructions and generate outcomes as follows. In some example implementations, the game processing architecture 300 implements a game processing pipeline for a process (e.g., base reel game or bonus reel game) that uses a boost stage with a metamorphic graphical element. The UI system 302 (e.g., the game play UI 304 or bonus game play UI 308 of the UI system 302) causes display of a metamorphic graphical element for a boost stage. For a play, the UI system 302 (e.g., the game play UI 304 or bonus game play UI 308) makes one or more RNG calls to the game processing backend system 314. In response, the backend system 314 performs various operations. For example, using a gaming RNG 318, the RNG engine 316 generates one or more random numbers, which are passed to the RNG conversion engine 320. The RNG conversion engine 320, using one or more of the random number(s) and one or more of the lookup tables 322A . . . 322N, determines symbol stop positions for reels. After determining symbol stop positions for the reels, the backend system 314 determines results (e.g., calculating whether any win conditions exist on pay lines). In particular, the backend system 314 determines (e.g., based at least in part on count of target symbols) whether a result satisfies a trigger condition for a supplemental feature, satisfies a predetermined condition, or satisfies neither condition. If the result satisfies the predetermined condition, the backend system 314 triggers a boost stage that uses the metamorphic graphical element. The backend system 314 returns generated result to the game play UI 304 or bonus game play UI 308 of the UI system 302, which can among other operations control display of a result that satisfies the predetermined condition. For example, the game play UI 304 or bonus game play UI 308 stops the spinning of reels at the symbol stop positions returned for respective reels and/or selectively transfers target symbols.

When the boost stage is started, the backend system 314 performs various other operations. For example, using a gaming RNG 318, the RNG engine 316 generates one or more random numbers, which are passed to the RNG conversion engine 320. The RNG conversion engine 320, using one or more of the random number(s) and one or more of the lookup tables 322A . . . 322N, determines whether the supplemental feature is triggered for the boost stage (e.g., by determining whether the previous result associated with the predetermined condition is enhanced thereby satisfying a trigger condition for the supplemental feature). The backend system 314 also adjusts the metamorphic graphical element. Specifically, if the supplemental feature is triggered, the backend system 314 resets the metamorphic graphical element. Otherwise (the supplemental feature not being triggered), the backend system 314 advances the current state of the metamorphic graphical element to the next higher state value, if any. The backend system 314 returns generated results to the game play UI 304 or bonus game play UI 308 of the UI system 302, which adjusts the display of the metamorphic graphical element. Specifically, if the supplemental feature has been triggered, the UI system 302 causes display of the metamorphic graphical element as reset. Otherwise (the supplemental feature has not been triggered), the UI system 302 causes display of the metamorphic graphical element with its current state advanced to the next higher state value, if any. The UI system can also cause output of other indications of results (e.g., showing an animation to start the supplemental feature).

In general, the generated results returned by the backend system 314 can include game-related information (such as symbol stop positions for the respective reels, outcomes) as well as animation effects not related to game parameters. Alternatively, the game play UI 304 (or bonus game play UI 308) can make one or more separate RNG calls to the backend system 314 to determine animation effects. In response, the backend system 314 can use the gaming RNG 318 and/or one or more of the non-gaming RNGs 319A . . . 319N to generate random numbers, which the RNG conversion engine 320 uses (with one or more of the lookup tables 322A . . . 322N) to determine animation effects. The game play UI 304 (or bonus game play UI 308) can perform operations consistent with the animation effects, which are returned from the backend system 314.

A typical electronic gaming device is a specially-configured computer system, and not merely a general-purpose computer. For example, one difference between a typical electronic gaming device and common processor-based computer system is that the electronic gaming device is designed to be a state-based system. In a state-based system, the system stores and maintains its current state in non-volatile memory, which can be implemented using battery-backed RAM, flash memory, a solid-state drive, or other persistent memory. Different functions of a game (e.g., bet, play, result, points in the graphical presentation, etc.) may be defined as a state. When a game moves from one state to another, data regarding the game state is stored in a custom non-volatile memory subsystem. In some cases, the gaming device does not advance from a current state to a subsequent state until information that allows the current state to be reconstructed is stored. In the event of a power failure or other malfunction, the gaming device will return to its current state when the power is restored by recovering state information from non-volatile memory. The restored state may include metering information and graphical information that was displayed on the gaming device in the state prior to the malfunction. For instance, if a player was shown an award for a game of chance and, before the award could be provided to the player, the power failed, the gaming device, upon the restoration of power, would return to the state where the award is indicated. More generally, the gaming device records, in non-volatile memory, the values of game parameters assigned during play, such as variables determined by an RNG or internal counters. (A game parameter, in general, can be one or more variables whose values govern play at the gaming device and depend on a random selection process.) The value of a game parameter can be recorded periodically, in response to some event such as user input, or whenever the value of the game parameter changes. This way, the gaming device can recover its state in case of a power failure or "tilt" event, allowing the gaming device to reconstruct events that have taken place before the power failure or "tilt" event. This requirement affects the software and hardware design on a gaming device. Game history information regarding previous games played, such as an amount wagered, the outcome of the game and so forth, may also be stored in a non-volatile memory device. In the context of the innovations described herein, for example, a game controller 202 can save information about the current state of a metamorphic graphical element in non-volatile memory at various stages. After the metamorphic graphical element is reset to an initial state value, or after the state of the metamorphic graphical element advances to a higher state value, the game controller 202 can save information in non-volatile memory that indicates the state value. The non-volatile memory can also store other state information, such as a current bet amount, bet level, an amount of credits remaining, and/or a win amount for a base reel game, bonus reel game, and/or other supplemental feature. More generally, non-volatile memory can store state information such as positions of the respective reels, in addition to storing information that indicates the configuration of reel strips of the reels. After finishing a base reel game or supplemental feature, the game controller 202 can store information in non-volatile memory that indicates an outcome (e.g., award amount) or status.

K. Technical Advantages

Approaches described herein address the technical problem of how to manage interaction between a metamorphic graphical element and a boost stage for selectively triggering a supplemental feature. The approaches provide a way to visually convey how many times a predetermined condition such as a near-miss condition for the boost stage has occurred, by adjusting a metamorphic graphical element when the predetermined condition occurs, and by resetting the metamorphic graphical element when the supplemental feature is triggered for the boost stage.

In terms of technical effects, innovative features of a boost stage with a metamorphic graphical element represent improvements in the technical area of electronic gaming software and provide new technology, in that they improve usability of electronic gaming devices by enhancing the user experience for players, extending player time on the electronic gaming devices, and maintaining the interest of current players in the electronic gaming devices. In some example implementations, the progression of a metamorphic graphical element for the boost stage is visible to players. In particular, the progression of a metamorphic graphical element for the boost stage may provide a build up to triggering of a supplemental feature, which may occur as a reward to players for extended play on an electronic gaming device. These embodiments are thus not merely new game rules or new display patterns.

In at least the state-adaptive variations, true-persistence implementations, and skipped-enhancement variations described herein, using a boost stage with a metamorphic graphical element offers new ways to achieve a desired game volatility (e.g., increase game volatility) while maintaining a designated level of RTP for a game. Furthermore, by managing lookup tables and/or other aspects of random number generation events for a boost stage with a metamorphic graphical element, game play can be kept fair and consistent with regulations while also enabling variation of game volatility for a designated level of RTP for a game.

V. Alternatives and Variations

Numerous embodiments are described in this disclosure, and are presented for illustrative purposes only. The described embodiments are not, and are not intended to be, limiting in any sense. The present disclosure is widely applicable to numerous embodiments, as is readily apparent from the disclosure. One of ordinary skill in the art will recognize that the innovations described herein may be practiced with various modifications and alterations, such as structural, logical, software, and electrical modifications. Although particular features of the innovations described herein may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the innovations described herein that must be present in all embodiments.

The Title (set forth at the beginning of the first page of this disclosure) is not to be taken as limiting in any way as the scope of the disclosed embodiments. Headings of sections provided in this disclosure are for convenience only, and are not to be taken as limiting the disclosure in any way.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When introducing elements of aspects of the present disclosure or embodiments thereof, the articles "a," "an," "the," and "said" are intended to mean that there are one or more of the elements. The terms "comprising," including,"

and "having" are intended to be inclusive and mean that there may be additional elements other than the listed elements.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Further, the systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the innovations described herein. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the innovations described herein, and does not imply that the illustrated process is preferred.

Although a process may be described as including a plurality of steps, that does not indicate that all or even any of the steps are essential or required. Various other embodiments within the scope of the present disclosure include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the present disclosure include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation. For example, "determining" something can be performed in a variety of manners, and therefore the term "determining" (and like terms) can indicate calculating, computing, deriving, looking up (e.g., in a table, database or data structure), ascertaining, recognizing, and the like.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network). Communication among computers and devices may be encrypted to insure privacy and prevent fraud in any of a variety of ways well known in the art.

It will be readily apparent that the various methods and algorithms described herein may be implemented by, e.g., appropriately programmed general-purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium for performing the process. The apparatus that performs the process can include components and devices (e.g., a processor, input and output devices) appropriate to perform the process. A computer-readable medium can store program elements appropriate to perform the method.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

The present disclosure provides, to one of ordinary skill in the art, an enabling description of several embodiments and/or innovations. Some of these embodiments and/or innovations may not be claimed in the present application, but may nevertheless be claimed in one or more continuing applications that claim the benefit of priority of the present application. Applicants may file additional applications to pursue patents for subject matter that has been disclosed and enabled but not claimed in the present application.

The foregoing description discloses only exemplary embodiments of the present disclosure. Modifications of the above disclosed apparatus and methods which fall within the scope of the present disclosure will be readily apparent to those of ordinary skill in the art. For example, although the examples discussed above are illustrated for a gaming market, embodiments of the present disclosure can be implemented for other markets. The gaming system environment of the examples is not intended to suggest any limitation as to the scope of use or functionality of any aspect of the disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A computer system comprising one or more processors and memory readable by the one or more processors, the memory having stored thereon computer-executable instructions for causing the one or more processors, when programmed thereby, to perform operations to control a user interface of an electronic gaming device, the operations comprising:

determining that a result of a game instance of one or more game instances is within a threshold range of satisfying a trigger condition for a supplemental feature;

providing, via the user interface, a metamorphic graphical element indicating how many times the one or more game instances have been within the threshold range of satisfying the trigger condition for the supplemental feature during a tracking period, wherein the metamorphic graphical element has a current state value; and in response to the determination that the result of a game instance is within the threshold range:

based at least in part on a result of a lookup operation for a random number in a lookup table, determining whether the trigger condition for the supplemental feature is satisfied; and in accordance with a determination that the trigger condition is satisfied based at least in part on the result of the lookup operation:

triggering the supplemental feature.

2. The computer system of claim 1, wherein the supplemental feature is a bonus reel game, a special mode that adds wild symbols to one or more sets of reels of a base reel game, a special mode that adds scatter symbols to the one or more sets of reels of the base reel game, or another special mode.

3. The computer system of claim 1, wherein the trigger condition for the supplemental feature is a threshold count of target symbols in one or more sets of reels of the game instance.

4. The computer system of claim 3, wherein the threshold range is a count of target symbols in one or more sets of reels of the game instance.

5. The computer system of claim 4, wherein the threshold range is a difference relative to the threshold count of target symbols.

6. The computer system of claim 5, wherein the threshold range is one target symbol less than the threshold count of target symbols.

7. The computer system of claim 1, wherein the tracking period:

restarts whenever the supplemental feature is triggered, such that the metamorphic graphical element indicates how many times the game instance and the one or more game instances have been within the threshold range since the supplemental feature was last triggered.

8. The computer system of claim 1, wherein the current state value is one of multiple state values wherein the multiple state values include:

an initial state value that corresponds to an initial depiction of the metamorphic graphical element; and multiple progressively-changing state values that correspond to successive depictions of the metamorphic graphical element.

9. The computer system of claim 8, wherein the metamorphic graphical element is a container, and wherein:

the initial depiction shows the container with a minimal amount of content, and the successive depictions show the container with successively larger amounts of content; or the initial depiction shows the container with a maximal amount of content, and the successive depictions show the container with successively smaller amounts of content.

10. The computer system of claim 8, wherein the successive depictions show the metamorphic graphical element at different stages of completion along a progression from the initial depiction to a final depiction, the final depiction being associated with a final state value among the multiple progressively-changing state values.

11. The computer system of claim 1, wherein the electronic gaming device is an electronic gaming machine with physical reels and video reels, and wherein the result of the game instance is a count of target symbols stopped in the video reels, the target symbols being selectively added to the video reels depending on results for the physical reels.

12. The computer system of claim 1, wherein the current state is advanced to the next state value, if any, among multiple state values by:

determining whether the current state is a highest state value;

if the current state is the highest state value, making no change to the current state; and otherwise, the current state not being the highest state value, adjusting the current state to have the next state value.

13. The computer system of claim 1, wherein the current state of the metamorphic graphical element is adjusted from any of multiple electronic gaming devices, and wherein the supplemental feature, when triggered, is:

shared among the any of the multiple electronic devices; or allocated to only one of the multiple electronic gaming devices.

14. The computer system of claim 1, the operations further comprising:

in response to the supplemental feature being triggered, the metamorphic graphical element is obscured by an animation of the supplemental feature.

15. The computer system of claim 1, the operations further comprising:

in response to the supplemental feature being triggered, displaying an animation transitioning to the supplemental feature.

16. The computer system of claim 1, the operations further comprising:

in response to the supplemental feature being triggered, displaying a new target symbol to the game instance.

17. The computer system of claim 1, the operations further comprising:

in response to completion of the supplemental feature, the current state value of the metamorphic graphical element is reset.

18. The computer system of claim 17, wherein the current state value is reset to an initial state value.

19. In a computer system, a method of controlling a user interface of an electronic gaming device, the method comprising:

determining that a result of a game instance of one or more game instances is within a threshold range of satisfying a trigger condition for a supplemental feature;

providing, via the user interface, a metamorphic graphical element indicating how many times the one or more game instances have been within the threshold range of satisfying the trigger condition for the supplemental feature during a tracking period, wherein the metamorphic graphical element has a current state value; and in response to the determination that the result of a game instance is within the threshold range:

based at least in part on a result of a lookup operation for a random number in a lookup table, determining whether the trigger condition for the supplemental feature is satisfied; and in accordance with a determination that the trigger condition is satisfied based at least in part on the result of the lookup operation:

triggering the supplemental feature.

20. A computer system comprising one or more processors and memory readable by the one or more processors, the memory having stored thereon computer-executable instructions for causing the one or more processors, when programmed thereby, to perform operations to control a user interface of an electronic gaming device, the operations comprising:

displaying a metamorphic graphical element indicating how many times one or more game instances have been within a threshold range of satisfying a trigger condition for a supplemental feature during a tracking period, wherein the metamorphic graphical element has a current state value;

displaying a result of at least one game instance of the one or more game instances that is within the threshold range of satisfying the trigger condition for the supplemental feature during the tracking period; and in response to the determination that the result of a game instance is within the threshold range:

based at least in part on a result of a lookup operation for a random number in a lookup table, determining whether the trigger condition for the supplemental feature is satisfied; and in accordance with a determination that the trigger condition is satisfied based at least in part on the result of the lookup operation:

triggering the supplemental feature.

* * * * *